United States Patent
Honda et al.

(10) Patent No.: US 9,092,361 B2
(45) Date of Patent: Jul. 28, 2015

(54) NONVOLATILE STORAGE DEVICE, MEMORY CONTROLLER, AND DEFECTIVE REGION DETECTION METHOD

(75) Inventors: Toshiyuki Honda, Kyoto (JP); Kunihiro Maki, Osaka (JP); Shigekazu Kogita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1213 days.

(21) Appl. No.: 11/995,600

(22) PCT Filed: Jul. 13, 2006

(86) PCT No.: PCT/JP2006/313978
§ 371 (c)(1),
(2), (4) Date: May 23, 2008

(87) PCT Pub. No.: WO2007/010829
PCT Pub. Date: Jan. 25, 2007

(65) Prior Publication Data
US 2009/0055680 A1    Feb. 26, 2009

(30) Foreign Application Priority Data
Jul. 15, 2005    (JP) ................. 2005-207198

(51) Int. Cl.
*G06F 11/00*    (2006.01)
*G06F 11/10*    (2006.01)

(52) U.S. Cl.
CPC ................. *G06F 11/1068* (2013.01)

(58) Field of Classification Search
USPC .................................... 714/8, 6.1
See application file for complete search history.

(56) References Cited

U.S. PATENT DOCUMENTS

| | | | |
|---|---|---|---|
| 6,119,245 A | 9/2000 | Hiratsuka | |
| 6,339,546 B1 | 1/2002 | Katayama et al. | |
| 6,798,697 B2 * | 9/2004 | Hosono et al. | 365/185.12 |
| 2001/0052093 A1 * | 12/2001 | Oshima et al. | 714/719 |

(Continued)

FOREIGN PATENT DOCUMENTS

| | | |
|---|---|---|
| JP | 11-053266 | 2/1999 |
| JP | 2003-015929 | 1/2003 |

(Continued)

OTHER PUBLICATIONS

English language Abstract of JP 11-053266.
English language Abstract of JP 2003-015929.
English language Abstract of JP 2003-058432.

(Continued)

*Primary Examiner* — Sarai Butler
(74) *Attorney, Agent, or Firm* — Greenblum & Bernstein, P.L.C.

(57) ABSTRACT

It is possible to accurately detect a physical block which has caused a fixture defect in a flash memory so as to limit the use of the physical block. By recording a history of generation of a physical block error and a history of physical erasing in an ECC error record, it is judged whether the error which has occurred is accidental or caused by a fixture defect. When no error is caused in the data written by physical erasing after a first read error occurrence, the first error is accidental and if another error is caused, the error is judged to be caused by a fixture defect. By using such an ECC error record, it is possible to accurately judge whether the error is accidental or caused by a fixture defect. By eliminating use of the physical block judged to have a fixture defect, it is possible to reduce read errors.

24 Claims, 24 Drawing Sheets

(56) References Cited

U.S. PATENT DOCUMENTS

2003/0033567 A1    2/2003   Tamura et al.
2003/0189860 A1   10/2003   Takeuchi et al.
2004/0260919 A1*  12/2004   Takahashi ................... 713/2
2005/0029051 A1*   2/2005   Hosono et al. ............... 185/17

FOREIGN PATENT DOCUMENTS

| JP | 2003-058432 | 2/2003 |
|----|-------------|--------|
| WO | 01/22232    | 3/2001 |

OTHER PUBLICATIONS

U.S. Appl. No. 11/909,311 to Honda, which was filed Sep. 21, 2007.
U.S. Appl. No. 11/912,700 to Honda et al., which was filed Oct. 26, 2007.
U.S. Appl. No. 11/993,631 to Inoue et al., which was filed Dec. 21, 2007.
U.S. Appl. No. 11/732,362 to Nakanishi et al., which was filed Jun. 21, 2007.
U.S. Appl. No. 11/817,532 to Nakanishi et al., which was filed Aug. 31, 2007.

* cited by examiner

NONVOLATILE STORAGE DEVICE, MEMORY CONTROLLER, AND DEFECTIVE REGION DETECTION METHOD

TECHNICAL FIELD

The present invention relates to a nonvolatile storage device, memory controller, and defective region detection method for reducing non accidental read errors generated by a defect of a nonvolatile memory, in the nonvolatile storage device using an error correcting function for improving reliability of data recorded in the nonvolatile memory.

BACKGROUND ART

A memory card mounting a nonvolatile memory expands its market as the memory card for a digital camera and a mobile phone. In the nonvolatile memory, however, memory cells gradually deteriorate every time data is rewritten, and finally, writing and reading errors will occur. Obviously, if the deterioration of the memory cells caused by the rewriting can be almost ignored because of sufficiently high reliability thereof, there will be no problem even in a usage for 10 years. It cannot be so actually, thus, by mounting an error correction circuit such as an ECC (Error Check and Correct) circuit on a system for controlling the nonvolatile memory, the memory card with substantially high reliability is realized.

However, a single piece of the memory cell is difficult to keep its reliability due to miniaturization of a size of the memory cell by a process refinement and being multileveled for realizing a large capacity. Since an area of memory patterns increases as the capacity thereof increases and time for a product inspection becomes long, sufficiently accurate inspection for the device becomes difficult.

For managing the writing and reading errors in the flash memory, Patent document 1 discloses a method for avoiding usage of the deteriorated area by counting the number of error occurrences in the writing and reading. Patent document 2 proposes a method for replacing an area in which the reading errors occur in succession.

Patent document 1: Japanese Unexamined Patent Publication No. Hei 11-53266
Patent document 2: WO01/022232

DISCLOSURE OF INVENTION

Problems to be Solved by the Invention

Most nonvolatile memories including a flash memory have a performance which continuously keeps data without applying energy such as a bias for a memory cell. This shows that a status where the data is kept is stable. That is different from a status of a SRAM, a volatile memory, keeping data by applying the energy. When rewriting data in the nonvolatile memory, the memory cell slightly deteriorates since the energy needs to be applied for the memory cell that is in the stable state.

An error which occurs in the nonvolatile memory such as the flash memory because of the deterioration of the memory cell is mainly caused by data rewriting and little by data reading. A process at the time when the error occurs can be adequately executed by considering this, while in nonvolatile storage devices described in Patent document 1 and Patent document 2, the deterioration of the nonvolatile memory caused by the rewriting and the reading is not considered sufficiently. An influence for the error occurrence by the data reading is quite little compared to the rewriting. The influence by the data reading, however, cannot be ignored since not the memory cell but the data itself gradually deteriorates when the reading to the same data is repeated in large number. The nonvolatile storage devices described in Patent document 1 and Patent document 2 do not sufficiently consider such progressive deterioration of data.

For example, a NAND type flash memory, a typical nonvolatile memory, is manufactured on the premise that the error is corrected by the ECC circuit. That is because accidental bit errors cannot be prevented in the nonvolatile memory. Hence, a memory controller of a memory card using the NAND type flash memory includes functions for generating ECC codes and for detecting and correcting the error therein. The memory controller corrects the accidental bit errors by using the ECC circuit and reuses a physical block causing the error. Herewith, substantial reliability of the memory card is improved.

Despite low frequency compared to the accidental bit error, however, a bit error sometimes occurs in reading as the result of a fixed defect existing in a physical block caused by the deterioration of the memory cell and the like. In a case where the NAND type flash memory with sufficiently high reliability and low frequency of the bit error is used, there is no problem in use of the flash memory even when use of a physical block is restricted without judging whether the occurring bit error is caused by an accident or a fixed defect like a conventional memory controller. However, the bit error occurs more frequently than in the conventional flash memory due to refining of a process of the flash memory and multi-leveling. As a result, it is required to tolerate the existence of the bit error on the premise of error correction, and to continue to use the flash memory through the error correction even if the bit error occurs. When the bit error arises from the fixed defect of the memory cell, however, a physical block with the fixed defect causes a reading error frequently.

For example, there is a case where a still image taken by a digital camera cannot be displayed due to a data error caused by a fixed defect in a physical block of a memory card. In such a case, if a user deletes the data of the still image on a system of the digital camera, the data error occurs again due to reuse of the same physical block for subsequently taken still images. As a result, the still image cannot be displayed frequently.

If not the fixed defect, data sometimes deteriorates because bit errors gradually increase when reading for the same data is repeated in extraordinary number of times. Even in this case, when the NAND type flash memory with sufficiently high reliability and low frequency of the bit errors is used, use of the physical block may be restricted based on an occurrence of the bit error like a conventional memory controller. When it is assumed to execute the error correction as a premise, that is, when it is required to tolerate the existence of the bit error, continuous use of the flash memory through the error correction is required even if the bit error occurs. For this reason, the number of error bits caused by the deterioration of data exceeds an error correction ability and it results in occurrence of uncorrectable reading errors. As a result, development of a memory card for reducing reading errors is addressed.

The present invention adequately detects a physical block which is assumed to have a fixed defect or assumed to have accumulated bit defects produced by reading which exceed the error correction ability. Furthermore, the present invention intends to provide a highly reliable nonvolatile storage device by restricting or by avoiding writing and reading for the physical block.

Means to Solve the Problems

To solve the problems, a nonvolatile storage device according to the present invention comprises: a nonvolatile memory;

and a memory controller, wherein said nonvolatile memory includes a plurality of physical blocks of erasing units and said physical block includes a plurality of physical pages of writing units, wherein said memory controller includes: a calculation processing unit for controlling the whole of the inside of said memory controller; an error correction circuit including a function for detecting an error of data read from said nonvolatile memory and a function for correcting the error when the error is correctable; and an address table retaining a necessary table for managing data stored in said nonvolatile memory, wherein the address table in said memory controller includes: an error table having a plurality of error records regarding reading errors detected in a physical block by said error correction circuit; an entry table having information regarding whether data is already written and erased for respective physical blocks of said nonvolatile memory; and a logical-physical conversion table showing conversion information between logical block addresses specified from outside by a host device and physical block addresses of said nonvolatile memory, and wherein said calculation processing unit registers and updates the error record in said error table based on error detection by said error correction circuit, and judges whether or not using a physical block in which said reading error is detected.

The address table of said memory controller may further include a bad block table for recording information regarding addresses of the physical blocks which are prevented from writing and reading data, the error record of said error table may include: error block information for recording information showing addresses of physical blocks in which an error occurred when said error correction circuit detects the error of data read from said nonvolatile memory; error information for recording information showing occurrence of said error; error block erase information for recording information showing that data of said physical block is erased and new data is written after said error occurred; and error recurrence information showing that an error is detected in the same physical block again after the information was recorded into said error block erase information, and said calculation processing unit refers to said error table when writing data into said nonvolatile memory, and, when the error record recording at least said error block information and said error recurrence information about a physical block to which data is written exists, may record information regarding an address of a physical block to which said data is written.

The error record of said error table further may include: error page information recording an address of said physical page in which said error correction circuit detected a reading error.

Said calculation processing unit may record information into the error record of said error table and update the information only when error correction by said error correction circuit of reading error detected by said error correction circuit is impossible.

Said calculation processing unit may record information into the error record of said error table and update the information only when error correction by said error correction circuit of reading error detected by said error correction circuit is impossible.

The address table of said memory controller may further include a bad block table for recording information regarding addresses of the physical blocks which are prevented from writing and reading data, the error record of said error table may include: error block information for recording information showing addresses of the physical blocks in which an error occurred when said error correction circuit detects the error of data read from said nonvolatile memory; error counter information which is information showing the occurrence number of reading errors; error block erase counter information showing the number of physical erasing to the physical block in which said reading error occurred, and said calculation processing unit refers to said error table when writing data into said nonvolatile memory, compares said error counter information to said error block erase information when the error record recording said error block information about a physical block to which data is written exists, and may record information regarding an address of a physical block to which said data is written when said error block erase information shows a predetermined number and said error counter information is a value larger than that of said error block erase information.

The error record of said error table may further include error page information recording an address of said physical page in which said error correction circuit detected a reading error.

Said calculation processing unit may register the error record of said error table and update the error record regardless of possibility of correction by said error correction circuit when said error correction circuit detects an reading error.

Said calculation processing unit may register the error record of said error table and update the error record regardless of possibility of correction by said error correction circuit when said error correction circuit detects an reading error.

The error record of said error table may include: error block information recording an address of a physical block in which said error correction circuit detected a reading error; error page information recording an address of a physical page in which said error correction circuit detected said reading error; and an error bit counter for recording information showing the bit number of said reading error, and said calculation processing unit may read data of a physical block corresponding to the error record of said error table in which information of said error bit counter is in said correction threshold value or more, with using a predetermined correction threshold value which is a value equal to or less than the number of error bits correctable by said error correction circuit, directs said error correction circuit to correct error of read data, and write the corrected data into another physical block.

Said calculation processing unit may read data of a physical block corresponding to the error record of said error table in which information of said error bit counter is in said correction threshold value or more, with using a predetermined correction threshold value which is a value equal to or less than the number of error bits correctable by said error correction circuit, direct said error correction circuit to correct error of read data, and write the corrected data into another physical block when data reading processing is not implemented to said nonvolatile memory from outside.

The error record of said error table may include: error block information recording information showing an address of a physical block in which said error correction circuit detected a reading error; error page information recording information showing an address of a physical page in which said error correction circuit detected said reading error; and an error occurrence information for recording information showing that a reading error occurred, the number thereof is a predetermined correction threshold value equal to or less than the number of error bits correctable by said error correction circuit, and said calculation processing unit may read data of a physical block corresponding to the error record of said error table in which said error occurrence information is recorded, direct said error correction circuit to correct error of read data, and write the corrected data into another physical block.

Said calculation processing unit may read data of a physical block corresponding to the error record of said error table in which said error occurrence information is recorded, direct said error correction circuit to correct error of read data, and write the corrected data into another physical block when processing for reading data of said nonvolatile memory is not implemented.

To solve the problems, a memory controller according to present invention for controlling data reading and writing for a nonvolatile memory including a plurality of physical blocks of erasing units, wherein said physical block includes a plurality of physical pages of writing units, comprises: a calculation processing unit for controlling the whole of the inside of said memory controller; an error correction circuit including a function for detecting an error of data read from said nonvolatile memory and a function for correcting the error when the error is correctable; and an address table retaining a necessary table for managing data stored in said nonvolatile memory, wherein the address table in said memory controller includes: an error table having a plurality of error records regarding reading errors detected in a physical block by said error correction circuit; a logical-physical conversion table showing conversion information between logical block addresses specified from outside by a host device and physical block addresses of said nonvolatile memory, and wherein said calculation processing unit registers and updates the error record in said error table based on error detection by said error correction circuit, and determines whether or not using a physical block in which said reading error is detected.

Said address table may further include a bad block table for recording information regarding addresses of the physical blocks which are prevented from writing and reading data, the error record of said error table may include: error block information for recording information showing addresses of physical blocks in which an error occurred when said error correction circuit detects the error of data read from said nonvolatile memory; error information for recording information showing occurrence of said error; error block erase information for recording information showing that data of said physical block is erased and new data is written after said error occurred; and error recurrence information showing that an error is detected in the same physical block again after the information was recorded into said error block erase information, and said calculation processing unit refers to said error table when writing data into said nonvolatile memory, and, when the error record recording at least said error block information and said error recurrence information about a physical block to which data is written exists, may record information regarding an address of a physical block to which said data is written.

The error record of said error table may further include: error page information recording an address of said physical page in which said error correction circuit detected a reading error.

Said calculation processing unit may record information into the error record of said error table and update the information only when error correction by said error correction circuit of reading error detected by said error correction circuit is impossible.

Said calculation processing unit may record information into the error record of said error table and update the information only when error correction by said error correction circuit of reading error detected by said error correction circuit is impossible.

Said address table further includes a bad block table for recording information regarding addresses of the physical blocks which are prevented from writing and reading data, the error record of said error table may include: error block information for recording information showing addresses of the physical blocks in which an error occurred when said error correction circuit detects an error of data read from said nonvolatile memory; error counter information which is information showing the occurrence number of reading errors; error block erase counter information showing the number of physical erasing to the physical block in which said reading error occurred, and said calculation processing unit refers to said error table when writing data into said nonvolatile memory, compares said error counter information to said error block erase information when the error record recording said error block information about a physical block to which data is written exists, and may record information regarding an address of a physical block to which said data is written when said error block erase information shows a predetermined number and said error counter information is a value larger than that of said error block erase information.

The error record of said error table may further include error page information recording an address of said physical page in which said error correction circuit detected a reading error.

Said calculation processing unit may register the error record of said error table and update the error record regardless of possibility of correction by said error correction circuit when said error correction circuit detects an reading error.

Said calculation processing unit may register the error record of said error table and update the error record regardless of possibility of correction by said error correction circuit when said error correction circuit detects an reading error.

The error record of said error table may include: error block information recording an address of a physical block in which said error correction circuit detected a reading error; error page information recording an address of a physical page in which said error correction circuit detected said reading error; and an error bit counter for recording information showing the bit number of said reading error, and said calculation processing unit may read data of a physical block corresponding to the error record of said error table in which information of said error bit counter is in said correction threshold value or more, with using a predetermined correction threshold value which is a value equal to or less than the number of error bits correctable by said error correction circuit, direct said error correction circuit to correct error of read data, and write the corrected data into another physical block.

Said calculation processing unit may reads data of a physical block corresponding to the error record of said error table in which information of said error bit counter is in said correction threshold value or more, with using a correction threshold value which is a value equal to or less than the number of error bits correctable by said error correction circuit predetermined, direct said error correction circuit to correct error of read data, and write the corrected data into another physical block when data reading processing is not implemented to said nonvolatile memory from outside.

The error record of said error table may include: error block information recording information showing an address of a physical block in which said error correction circuit detected a reading error; error page information recording information showing an address of a physical page in which said error correction circuit detected said reading error; and an error occurrence information for recording information showing that a reading error occurred, the number thereof is a predetermined correction threshold value equal to or less than the number of error bits correctable by said error correction circuit, and said calculation processing unit may read data of a physical block corresponding to the error record of said error table in which said error occurrence information is recorded, direct said error correction circuit to correct error of read data, and write the corrected data into another physical block.

Said calculation processing unit may read data of a physical block corresponding to the error record of said error table in which said error occurrence information is recorded, direct said error correction circuit to correct error of read data, and write the corrected data into another physical block when processing for reading data of said nonvolatile memory is not implemented.

To solve the problems, a defective region detection method according to the present invention in a nonvolatile storage device including: a nonvolatile memory including a plurality of physical blocks of erasing units, wherein said physical block includes a plurality of physical pages of writing units; an error correction circuit including a function for detecting an error of data read from said nonvolatile memory and a function for correcting the error when the error is correctable; and a memory controller including an error table having a plurality of error records which is information regarding said reading error about a physical block in which a reading error is detected, comprises steps of: determining a physical address based on a logical address specified from the outside when data is read; reading data from a physical block corresponding to said physical address; outputting, when a correctable error exists in the read data, said error after correcting the error; and registering said physical address to said error table.

The defective region detection method according to the present invention may comprise steps of: registering, when data of a physical block whose physical address is registered in said error table is rewritten, information showing that said data was rewritten to said error table; outputting, when a correctable data exists in data read from the physical block in which said data is rewritten, the error to the outside after correcting the error, and registering error recurrence information to said error table, which shows that an error occurred after rewriting said data; and preventing the physical block for which said error recurrence information is registered in said error table from writing and reading data.

The defective region detection method according to the present invention may comprise steps of: registering, when data of a physical block whose physical address is registered in said error table is rewritten, error block erase counter showing the rewriting number of said data to said error table; outputting, when a correctable data exists in data read from the physical block in which said data is rewritten, the error to the outside after correcting the error, and registering error recurrence information to said error table, which shows that an error occurred after rewriting said data; and preventing the physical block for which said error counter is registered from writing and reading data when said error counter indicates a predetermined value or more.

To solve the problems, a defective region detection method according to the present invention in a nonvolatile storage device including: a nonvolatile memory including a plurality of physical blocks of erasing units, wherein said physical block includes a plurality of physical pages of writing units; an error correction circuit including a function for detecting an error of data read from said nonvolatile memory and a function for correcting the error when the error is correctable; and a memory controller including an error table having a plurality of error records which is information regarding said reading error about a physical block in which a reading error is detected, comprises: a specifying step for determining a physical address based on a logical address specified by the outside and specifying a physical block from which data is read; a data reading step for reading data from said physical block; a data outputting step for outputting, when a correctable data exists in the read, said error to the outside after correcting the error; and an error number registering step for registering a physical address an physical address of the physical block in which said correctable error occurred and information regarding the error number to said error table.

The defective region detection method according to the present invention comprises: a copying step for copying data written in said physical block into another physical block when information regarding the error number registered in said error table indicates a predetermined value or more.

The defective region detection method according to the present invention may implement said copying step between said data reading step and said data outputting step.

The defective region detection method according to claim 31 which implements said copying step when data writing and reading are not implemented to said nonvolatile storage device from the outside.

The defective region detection method according to the present invention may implement said copying step immediately after electric power is supplied for said nonvolatile storage device.

Effectiveness of the Invention

According to the present invention, by appropriately supposing a physical block assumed to have high possibility of error occurrence, writing and reading for the physical block can be restricted or avoided and a highly reliable nonvolatile storage device can be provided.

EXPLANATION OF REFERENCE NUMERALS

Figure 1:
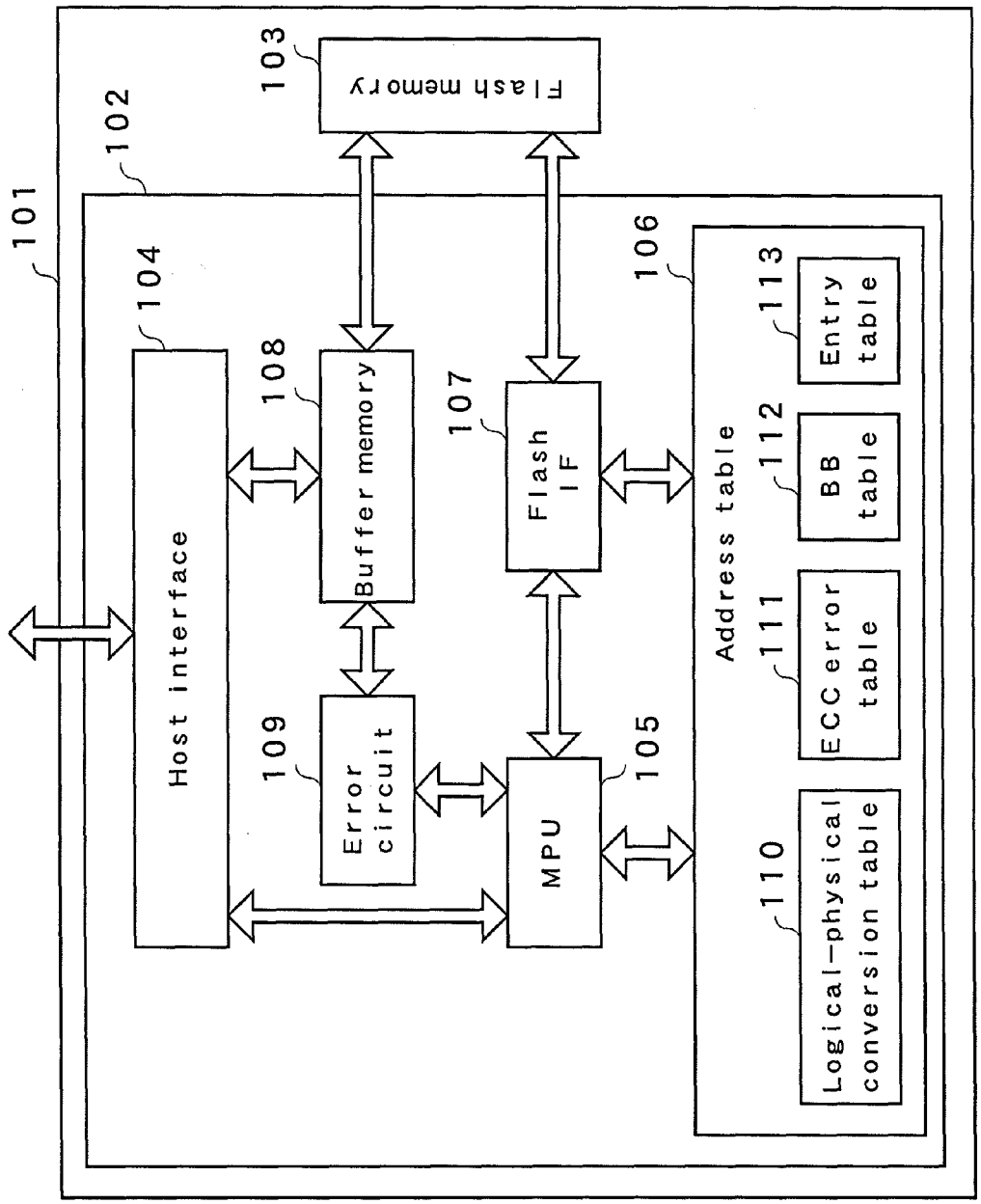
FIG. 1 is a block diagram showing a configuration of a nonvolatile storage device in a first embodiment.

101 Memory card
102 Memory controller
103 Flash memory
104 Host interface
105 MPU
106 Address table
107 Flash interface
108 Buffer memory
109 ECC circuit
110 Logical-physical conversion table
111 ECC error table
112 BB table
113 Entry table
501 ECC error record
601 Error block
602 Error occurrence information
603 Error block erase information
604 Error recurrence information
701 Memory card
702 Memory controller
703 Flash memory
704 Host interface
705 MPU
706 Address table
707 Flash interface
708 Buffer memory
709 ECC circuit
710 Logical-physical conversion table
711 ECC error table
712 Entry table
801 ECC error record
1001 Error page
1201 Error block
1202 Error counter
1203 Error block erase counter
1601 Error bit counter

BEST MODE FOR CARRYING OUT THE INVENTION

First Embodiment

FIG. 1 is a block diagram showing a configuration of a nonvolatile storage device in a first embodiment. A memory card 101 includes a memory controller 102 and a flash memory 103 of a nonvolatile memory.

Figure 2:
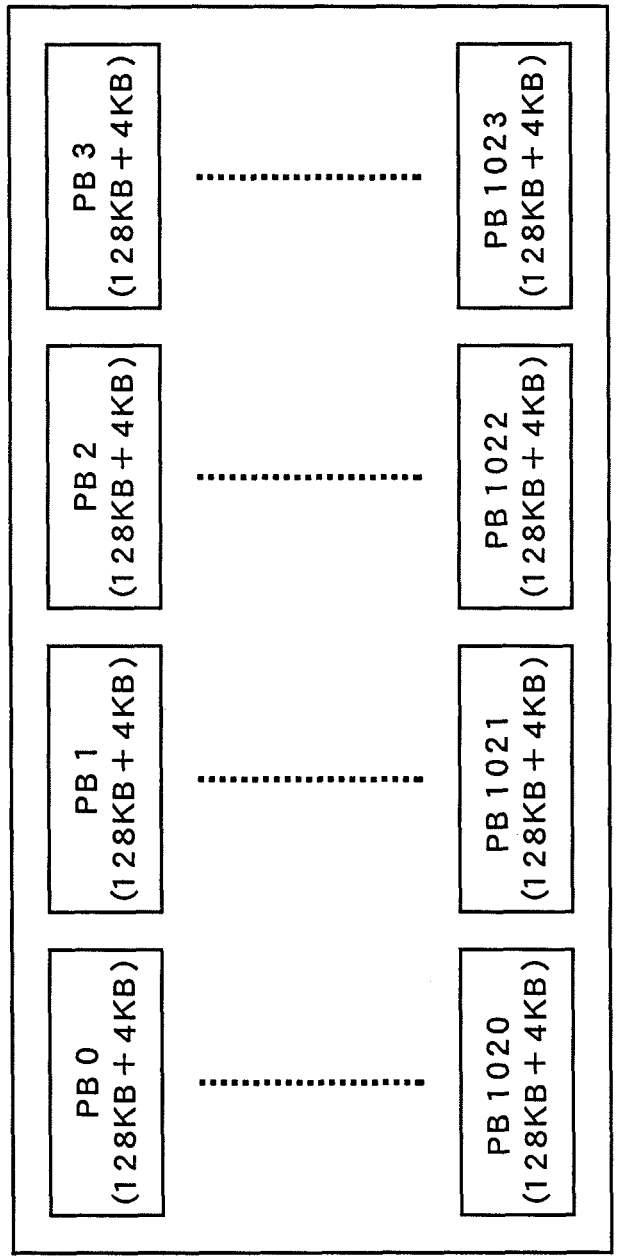
FIG. 2 is a block diagram showing an internal configuration of a flash memory.

FIG. 2 is a block diagram showing an internal configuration of the flash memory 103. The flash memory having a size of 1 Gbits will be explained here. An inside of the flash memory 103 is composed of 1024 physical blocks of PB0 to PB1023. The physical block is a minimum unit for data erasing in the flash memory 103. A size of a physical block is 128 kB+4 kB, and the size has not a value of the power of 2 but a slightly larger size than the power of 2. The expression of 128 kB+4 kB, not 132 kB, means that a data size which can be written into one physical block is 128 kB and, in addition to this, management data such as an ECC code and a logical address of the physical block is further written into the area of 4 kB.

Figure 3:
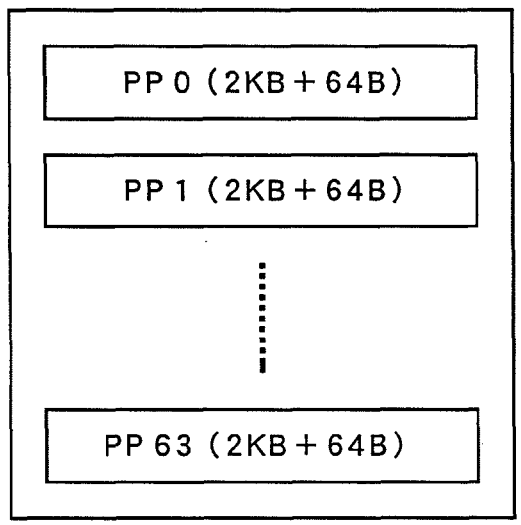
FIG. 3 is a block diagram showing an internal configuration of a physical block 201.

FIG. 3 is a block diagram showing an internal configuration of a physical block. Respective physical blocks in the flash memory 103 have 64 physical pages of PP0 to PP63. The physical page is a minimum unit of data writing in the flash memory 103. A size of a physical page is 2 kB+64 B. Similar to the above described physical block, this expression means that a data size which can be written into one physical page is 2 kB and management data including the ECC code is written into the remaining area of 64 B.

The memory controller 102 includes a host interface 104, an address table 106, a flash interface 107, a buffer memory 108, an ECC circuit 109, and an MPU (compact calculation processing unit) 105. The host interface 104 controls an interface with a host device connected to an outside of the memory card 101.

The address table 106 is a table for retaining management information of data stored in the flash memory 103, and includes a logical-physical conversion table 110, an ECC error table 111, an entry table 113, and a BB (Bad Block) table 112. These tables are stored in a volatile memory.

The logical-physical conversion table 110 is a table showing a correspondence relation of addresses of logical blocks, that is, logical addresses specified by the outside of the memory card 101 with addresses of physical blocks, that is, physical addresses inside the flash memory 103. The logical-physical conversion table 110 is used for obtaining the physical address corresponding to the logical block based on the logical address.

The ECC error table 111 retains a physical address of a physical block causing a reading error, a history of physical erasing of data, and an occurrence history of a reading error after the physical erasing and is used for detection of a physical block with a fixed defect.

The entry table 113 is a table for retaining information for respective physical blocks in the flash memory 103 showing whether data is already written or data is already erased, by 1 bit. A physical block in which data writing is completed is indicated by a bit "0", and a physical block in which data erasing is completed is indicated by a bit "1" for example.

Figure 4:
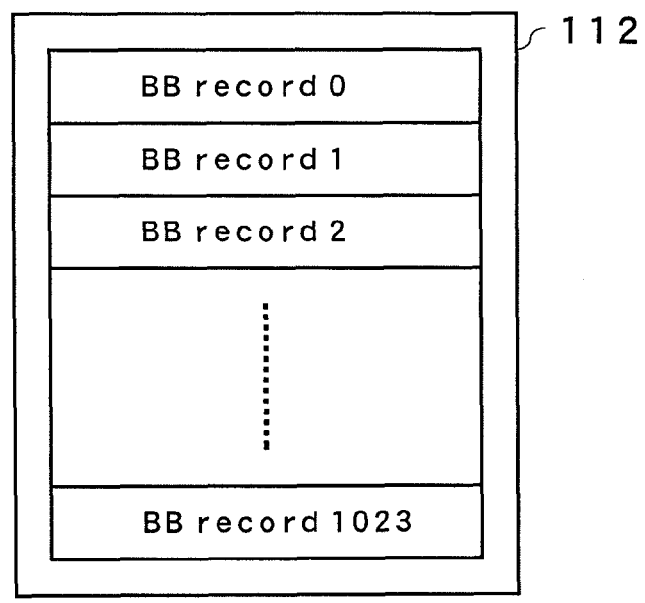
FIG. 4 is a view showing a configuration of a BB table 112.

FIG. 4 shows a configuration of the BB table 112. The BB table 112 includes the same number of BB records i (i=0 to 1023) as the number of physical blocks in the flash memory 103. The BB records i correspond to respective physical blocks one by one, and retain addresses of corresponding physical blocks. Furthermore, the BB records i retain information showing whether the corresponding physical blocks are bad blocks or not by 1 bit. A physical block which is the bad block is indicated by a bit "0", and a physical block which is not the bad block is indicated by a bit "1" in the BB record i. The BB table 112 may not retain BB records i for all the physical blocks. The BB records i may be retained only for bad blocks.

The flash interface 107 writes data of the buffer memory 108 into the flash memory 103 under the control of the MPU 105 described below, writes data of the flash memory 103 into the buffer memory 108, and erases data of the flash memory 103. The buffer memory 108 is a volatile memory for temporarily retaining data when the data is written or read between the external host device and the flash memory 103.

The ECC circuit 109 generates ECC codes added to writing data transferred from the buffer memory 108 to the flash memory 103. The ECC circuit 109 is an error correction circuit for executing an ECC calculation for data read from the flash memory 103 to the buffer memory 108 to detect an error, and for correcting data in the buffer memory 108 when the error is correctable.

The MPU 105 is a microcomputer for controlling the whole of the memory controller 102. The MPU 105 directly controls the host interface 104, the ECC circuit 109, the flash interface 107, and the address table 106 when writing and reading data with the host device. When error occurs in read data, the MPU 105 refers to information of the ECC error table 111 in the address table 106 and updates the ECC error table 111 if necessary. As a result, if the MPU 105 prohibits a physical block from being used, the MPU 105 records information of the physical block into the BB record i of the BB table 112 to update the BB table 112. Furthermore, the MPU 105 updates the entry table in accordance with contents of the updated BB table.

Figure 5:
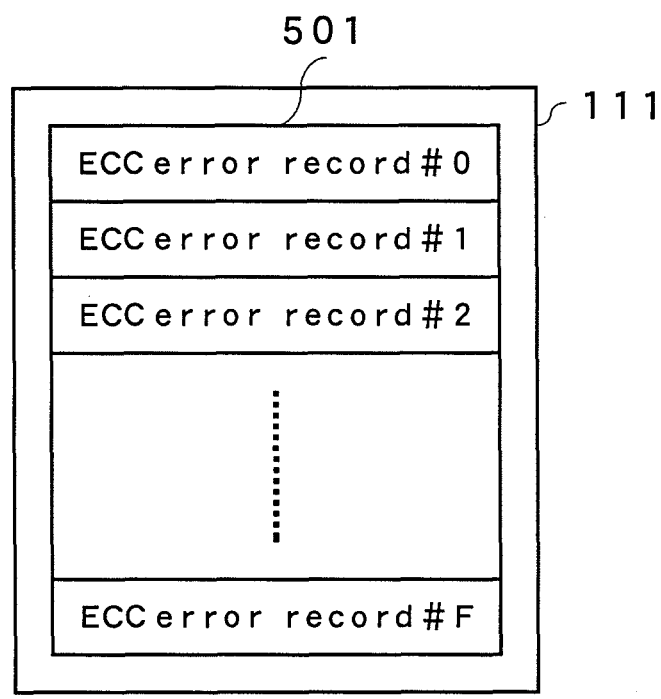
FIG. 5 is a view showing a configuration of an ECC error table 111.
Figure 6:
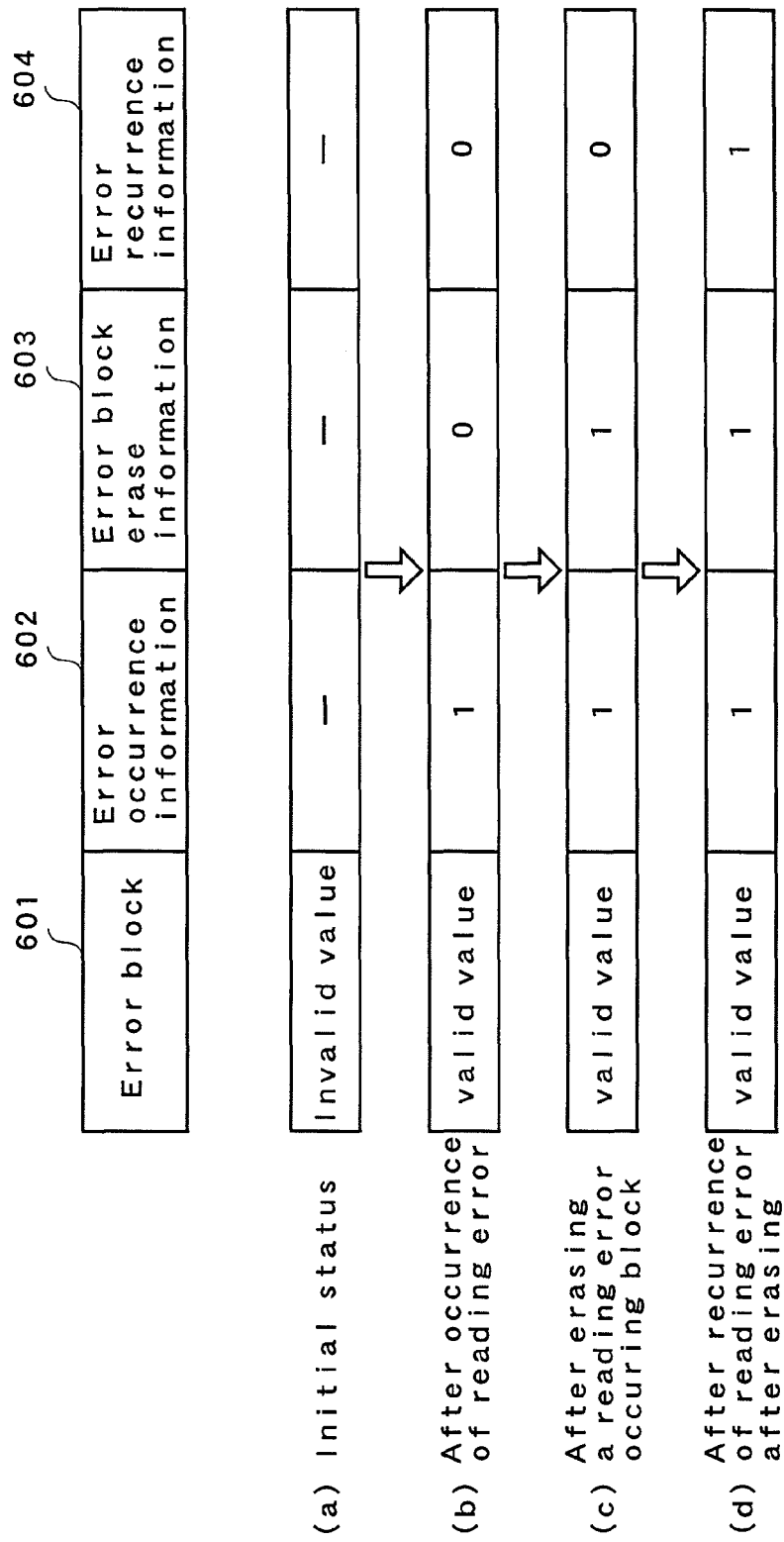
FIG. 6 is a view showing an ECC error record and change of information stored in the ECC error record in the first embodiment.

FIG. 5 is a view showing a configuration of the ECC error table 111. The ECC error table 111 is composed of 16 ECC records #i, from #0 to #F which are shown in hexadecimal number. FIG. 6 is a view showing fields of the ECC error record #i and change of information stored in the ECC error record #i. Respective ECC error records #i include an error block 601, error occurrence information 602, error block erase information 603, and error recurrence information 604. The error block 601 stores a physical address of a physical block 201 causing a reading error. The error occurrence information 602 is information showing that a first reading error occurred. The error block erase information 603 is information showing that physical erasing is executed to the physical block 201 after the first reading error occurred. The error recurrence information 604 is information showing that the reading error recurred in the same physical block even when the physical erasing was executed after the first reading error occurred.

Figure 7:
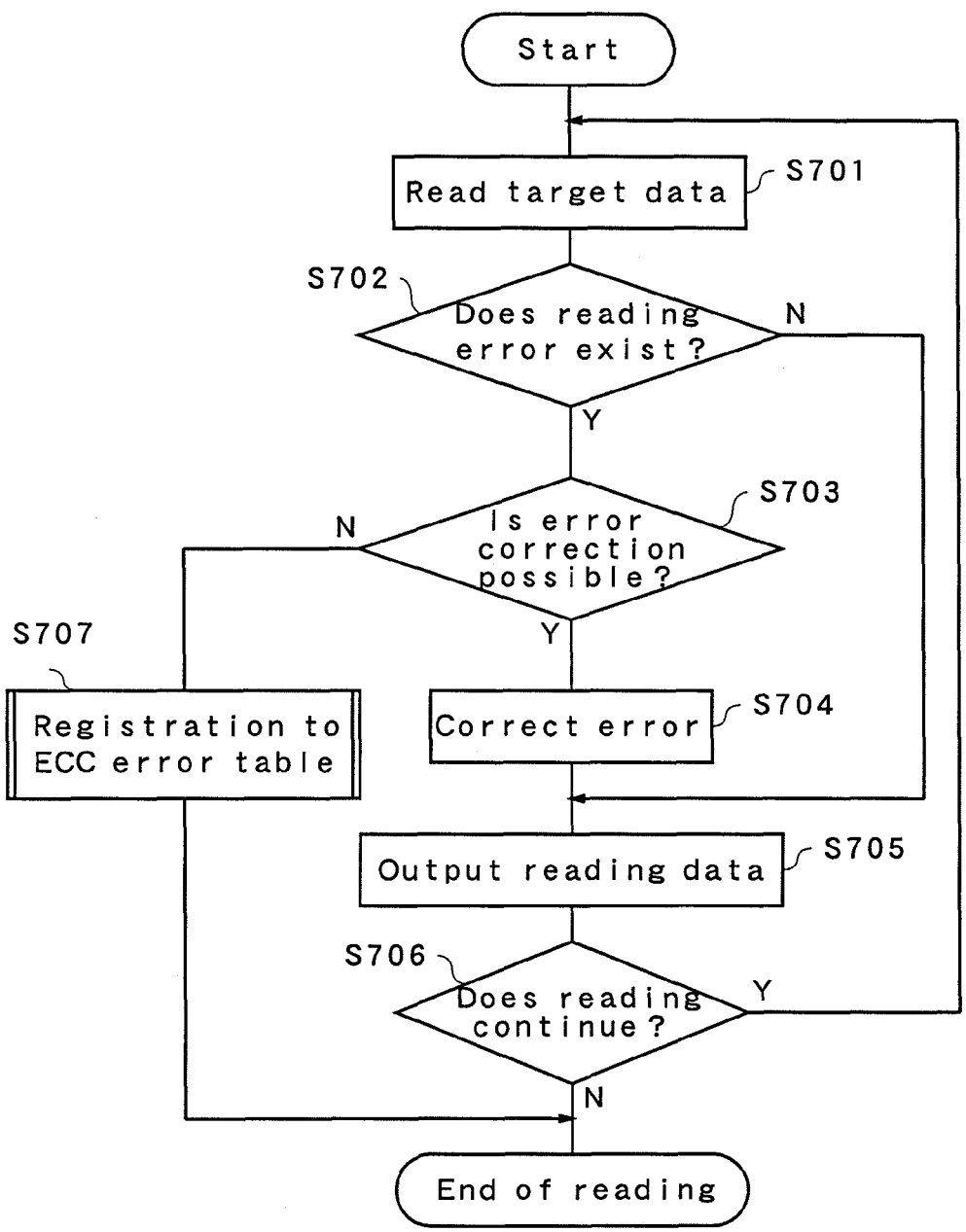
FIG. 7 is a flowchart of reading in the first embodiment.

FIG. 7 is a flowchart of data reading of the nonvolatile storage device in the present embodiment. When an external host device reads data from the memory card 101, the external host device sends a reading command and a starting address to the memory card 101. After receiving the command and the starting address, the host interface 104 notifies the MPU 105 of the receiving. The flowchart in FIG. 7 shows a process after receiving this notification.

The MPU 105 obtains, using the starting address, a physical block address from the logical-physical conversion table 110 by referring to a higher-order part of the address corresponding to the units of 128 kB as a logical block address. A lower-order part of the address corresponding to the units of 128 kB or less is used as the logical page address that is used for the logical page as is. Next, the MPU 105 indicates an address of a physical block and an address of physical page to be read for the flash memory interface 107, and reads data from the flash memory 103 (S701).

The ECC circuit 109 judges whether a reading error occurred or not for the data read at S701 (S702). When a reading error is not detected, the MPU 105 indicates the host interface 104 to output the data to the external host device (S705). As far as the reading continues subsequently (S706), the reading processing of data continues by returning to S701 with increasing the address in units of the reading.

When a reading error is detected at S702, the ECC circuit 109 judges whether the reading error is correctable or not (S703). If correctable, the ECC circuit 109 corrects the reading error (S704). Progressing to S705 after correcting the reading error, the read data is outputted. If uncorrectable, the ECC circuit 109 registers the ECC error table (S707) and finishes the reading process after the registration.

Figure 8:
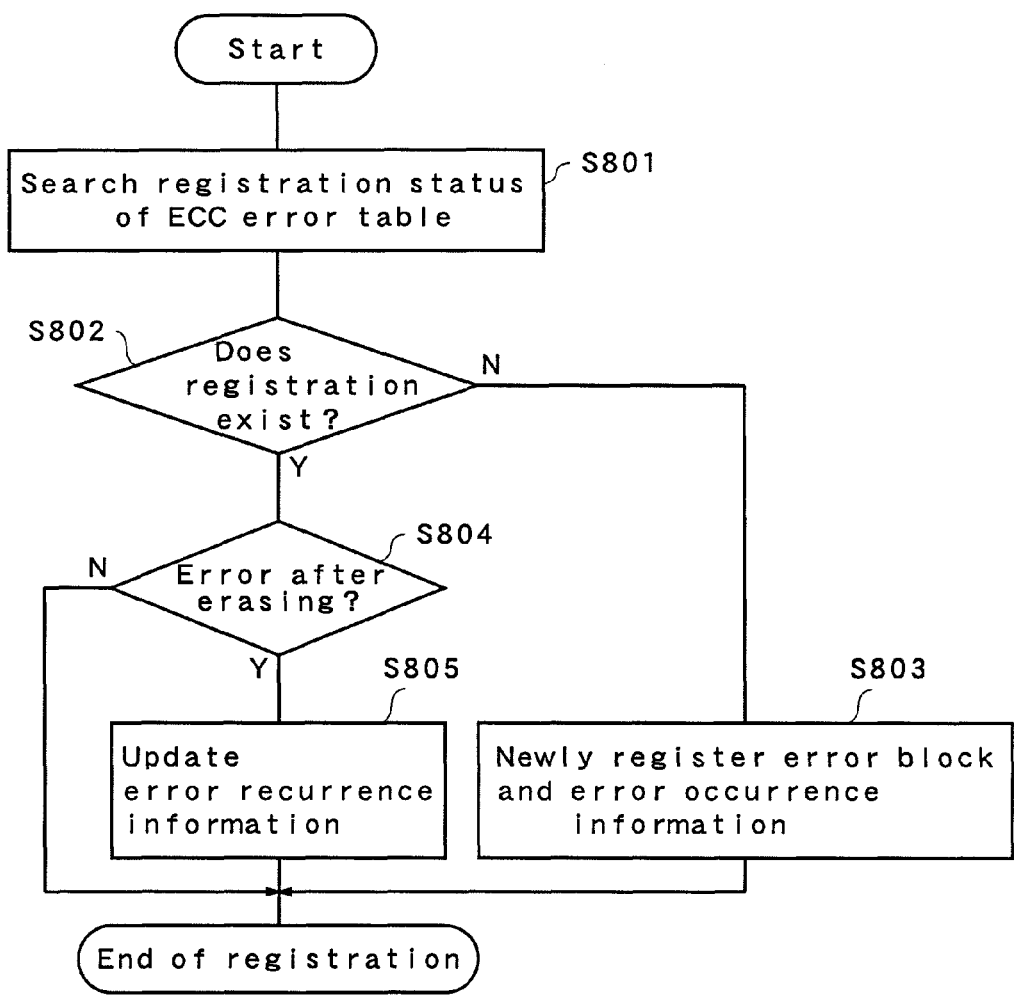
FIG. 8 is a flowchart of registration of the ECC error table in the first embodiment.

Using a flowchart in FIG. 8, the registration processing of the ECC error table (S707) will be explained. When the reading error is uncorrectable, the MPU 105 searches a registration status of the ECC error table 111 (S801). Concretely, the MPU 105 checks whether or not the physical address of the physical block causing a reading error corresponds to a value of the error block 601 in any one of the ECC error records #i.

When there is no corresponding ECC error record #i in the searching at S801, the MPU 105 Judges that no registration exists (S802). Subsequently, the MPU 105 registers new records to the error block 601 and the error occurrence information 602 (S803). FIG. 6(b) shows a status after the new registration. In the error block 601, an address of a physical block causing a reading error is written as a valid value. In the error occurrence information 602, information "1" indicating occurrence of a reading error is written, and, in the error block erasing information 603 and the error recurrence information 604, information "0" is written.

When a registration is there at S802, the MPU 105 judges whether or not the reading error occurred after physical erasing (S804). When the error block erasing information 603 of the ECC error record #i registered in the error block 601 is "0", the registration process is completed without updating the ECC error record #i and registering the ECC error table 111 because the reading error did not occur after physical erasing. Even if the number of occurrences of a reading error is counted after an occurred reading error and the information "1" was registered in the error occurrence information 602, it cannot be judged whether the occurring reading error is caused by accident or by a fixed defect as far as the same data in the same block is read. Accordingly, the registration processing is completed without updating the ECC error record #i.

When the error record #i is in a status shown in FIG. 6(c) at S804, it turned out that the reading error occurred after physical erasing since the error block erasing information 603 indicates the information "1". In this case, as shown in FIG. 6(d), the registration is completed after the error recurrence information 604 is rewritten to the information "1" (S805). That is to say, the reading error which requires updating contents of the error recurrence information 604 is a reading error which further occurs in data newly written after physical erasing for a physical block causing a reading error once.

Figure 9:
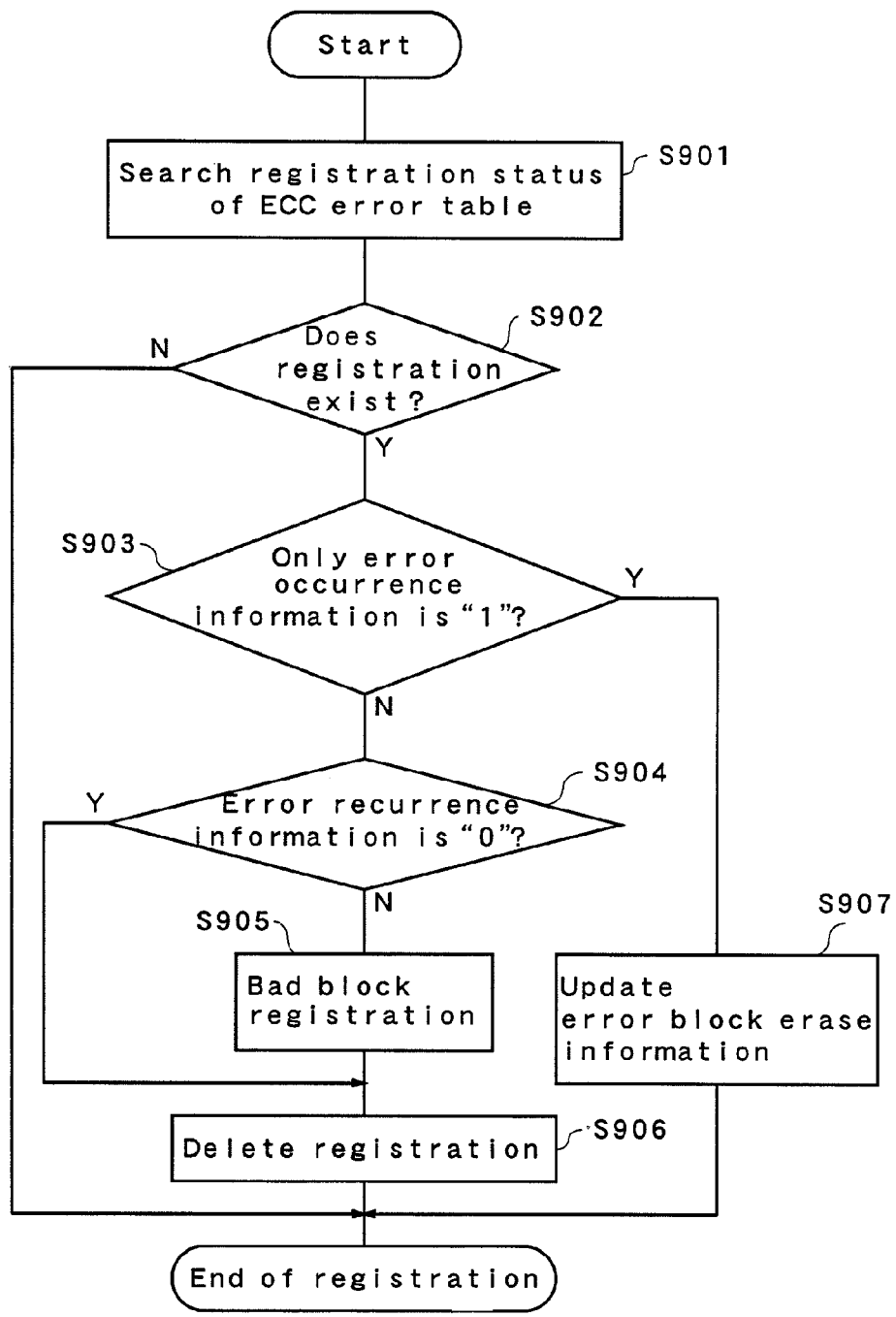
FIG. 9 is a flowchart of updating of the ECC error table in physical erasing in the first embodiment.

FIG. 9 is a flowchart of updating the ECC error table and of registration of a bad block in physical erasing executed in advance of data writing. When the external host device writes data into the memory card 101, the external host device sends a writing command and a writing starting address to the memory card 101. When receiving this command and the starting address, the MPU 105 searches the registration status of the ECC error table 111 (S901). Concretely, the MPU 105 checks whether an address of a physical block to be written is conformable to a value of the error block in the ECC error record.

In the searching at S901, when there is no ECC error record #i corresponding to the physical block to be written, the MPU 105 judges that no registration exists (S902) and the registration process is completed without registering of the ECC error table 111. To the contrary, when there is a corresponding ECC error record #i, the MPU 105 judges that a registration exists (S902). When only the error occurrence information 602 is "1" and the error block erase information 603 and the error recurrence information 604 are "0", there is a record only in the error occurrence information 602. The MPU 105 judges that the erasing is a first physical erasing after a reading error occurred (S903). In that case, the MPU 105 completes the updating of the ECC error table 111 by registering the information "1" in the error block erase information 603 (S907).

When the error occurrence information 602 and the error block erase information 603 indicate "1" and the error recurrence information 604 indicates "0", record is up to the error block erase information 603 (S904). According to this, it can be found that error did not occur in writing after physical erasing even though an error occurred once. That is to say, it is determined that the firstly occurring error is an accidental error. In this case, the updating of the ECC error table 111 is completed after deleting the registration of the ECC error record #i (S906). The deleting of the registration is realized by setting the value of the error block 601 of the ECC error record #i in FIG. 6(a) to be an invalid value.

As in FIG. 6(d), when all the information of not only the error occurrence information 602 and the error block erasing information 603 but also the error recurrence information 604 are "1", it turned out that a reading error previously occurred and a reading error further occurred in data written after physically erasing the physical block. In this case, the MPU 105 judges that a fixed defect causes the reading error, and registers the physical block causing the error as a bad block (S905). Subsequently, the updating of the ECC error table 111 is completed after deleting the registration of the ECC error record #i of the physical block (S906).

The bad block registration at S905 is realized by registering a bit "0" to the BB record i corresponding to an address of a corresponding physical block in the BB table 112 as explained above. Although the registration of a bad block is completed when the BB record i is registered, use of the bad block cannot be restricted only by this registration. The MPU 105 registers a bit "0" to the entry table 113 as to the physical block registered to the BB record i as a bit "0". When registering the bit "0" to the entry table 113, the MPU 105 can restrict the use of a bad block since the bad block is treated as a write completion block. The use of a bad block can be restricted by registering a bit "0" to the entry table for a physical block registered to the BB record i as a bad block.

The present embodiment is characterized by executing steps of: registering and updating the ECC error table only when an occurring reading error is uncorrectable; sorting ECC error records in the ECC error table in units of physical blocks; and registering a bad block when two errors occurred continuously in the same physical block after physical erasing between the errors. In the present embodiment, the ECC error table retains information for judging whether the occurring error is caused by an accident or by a fixed defect. When a reading error does not occur in data newly written after physical erasing of data of the physical block after a reading error occurred, the first error turned out to be accidental. After a first reading error, if a reading error occurs even in data newly written after physical erasing of data in the physical block, it can be judged that the reading error occurs due to a fixed defect. The present embodiment is able to adequately judge whether an error is caused by an accident or a fixed defect as described above. Since a physical block with a fixed defect is not used based on the judgment, the present embodiment has an effect of reducing a reading error.

Second Embodiment

FIG. 1 shows a configuration of the nonvolatile memory device according to the present embodiment. The memory card 101 includes the memory controller 102 and the flash memory 103 that is a nonvolatile memory. Respective components included in the memory controller 102 are the same as those explained in the first embodiment.

FIG. 2 is a view showing an internal configuration of the flash memory 103, the inside of the flash memory 103 includes 1024 physical blocks of PB 0 to PB 1023. FIG. 3 is a block diagram showing a configuration of the inside of a physical block, and respective blocks have 64 physical pages of PP0 to PP63. These are the same as those explained in the first embodiment.

The ECC error table 111 shown in FIG. 5 includes a plurality of the ECC error records #i, and is the same as that explained in the first embodiment.

Figure 10:
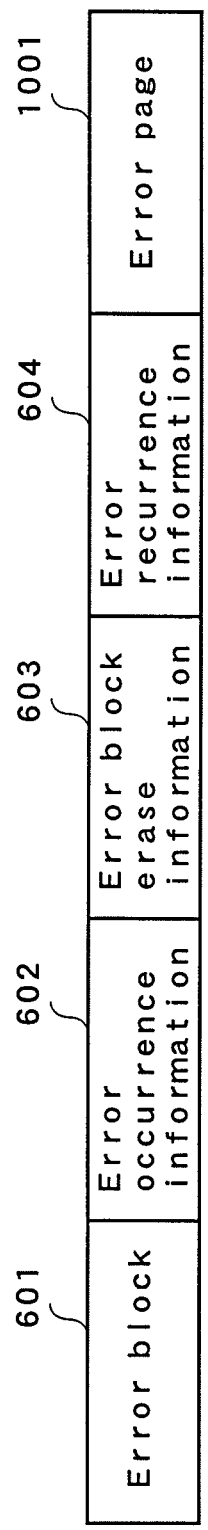
FIG. 10 is a view showing an ECC error record in a second embodiment.

FIG. 10 shows configuration of the ECC error records #i in the present embodiment. In FIG. 10, an error page 1001 is included in addition to the error block 601, the error occurrence information 602, the error block erase information 603, and the error recurrence information 604 which are shown in FIG. 6 of the first embodiment. Since this error page 1001 has addresses of physical pages in which a reading error was detected, the ECC error records #i can be configured in units of physical pages.

Figure 11:
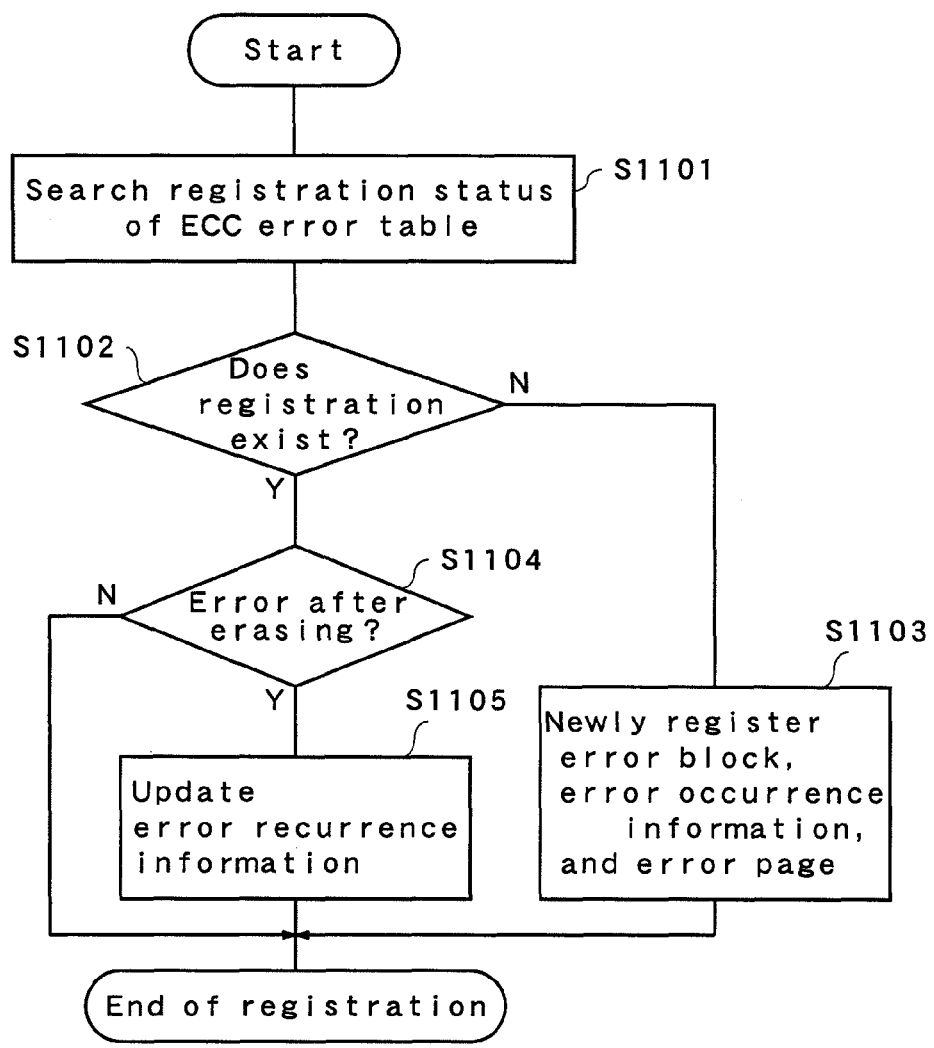
FIG. 11 is a flowchart of registration of an ECC error table in the second embodiment.

Data reading in the nonvolatile storage device of the present embodiment is executed according to the flowchart shown in FIG. 7, and processing in each step except S707 is the same as that in the first embodiment. Using FIG. 11, registration of the ECC error table in S707 executed when error correction is impossible in S703 will be explained here. At first, the MPU 105 searches a registration status of the ECC error table 111 and searches an ECC error record #i which retains an address of a physical block causing a reading error in the error block 601 and which retains an address of a physical page in the error page 1001 (S1101).

When there is no corresponding ECC error record #i in the searching in S1101, the MPU 105 judges that the ECC error record #i was not registered (S1102), and newly registers information of error occurrence to an ECC error record #i (S1103). This registration is completed by writing an address of a physical block having a page causing an error into the error block 601, information "1" indicating occurrence of the reading error into the error occurrence information 602, and a physical page address of a page causing an error into the error page 1001. Information "0" showing an initial value is registered into the error block erase information 603 and the error recurrence information 604 which are unnecessary in this registration.

When the MPU 105 judges that the registration exists in S1102, the MPU 105 judges whether or not the reading error occurred after physical erasing (S1104). If the error block erase information 603 of the registered ECC error record #i is "0", the MPU 105 judges that the physical erasing has not been executed yet and the reading error is not an error occurring after physical erasing, and finishes the processing without updating the ECC error record #i. This judgment is based on that the MPU cannot judge, as far as same data in same physical page data is read, whether the error is caused by accident or by a fixed defect even if the reading error occurs repeatedly.

FIG. 9 is a flowchart showing the ECC error table update and the bad block registration in physical erasing, processing in S901 will be explained since the processing is different from that of the first embodiment. When the searching in S901 is executed based on a physical block address that is a unit of the physical erasing, there is sometimes a case where several ECC error records #i of different physical page addresses in a physical block address are detected. That is to say, a plurality of the ECC error records #i having same value in the error block 601 and different values in the error page 1001 are detected (S901). Since a plurality of detected ECC error records #i are processing targets in next step in the order of detection in S901, processings after S902 are the same as those of the first embodiment.

The method of the bad block registration and the method for preventing use of bad block based on registration to the entry table are the same as those of the first embodiment.

The present embodiment is characterized by including the error page 1001 in the configuration of the ECC error record #i and newly registering the ECC error record #i for every address of a physical page. Even when errors continuously occur in same physical block, it can be identified whether the error occurred in different physical page or in same physical page, and it can be judged with high accuracy whether the error was caused by an accident or a fixed defect.

In the present embodiment, although a physical page which is a minimum unit for writing is a unit of page for reading, an error management with higher accuracy than an error management in physical block unit can be realized even when employing a unit for reading of the system configuration or a unit for adding an ECC code. The registration and update of the ECC error table may be executed regardless of possibility of correction for reading error.

Third Embodiment

FIG. 1 shows a configuration of a nonvolatile memory device according to the present embodiment. The memory card 101 includes the memory controller 102 and the flash memory 103 that is a nonvolatile memory. Respective components included in the memory controller 102 are the same as those explained in the first embodiment.

FIG. 2 is a block diagram showing an internal configuration of the flash memory 103, inside of the flash memory 103 includes 1024 physical blocks of PB 0 to PB 1023. FIG. 3 is a block diagram showing a configuration of inside of a physical block, and respective physical blocks have 64 physical pages of PP0 to PP63. These are the same as those explained in the first embodiment.

The ECC error table 111 shown in FIG. 5 includes a plurality of the ECC error record #i, and is the same as that explained in the first embodiment.

Figure 12:
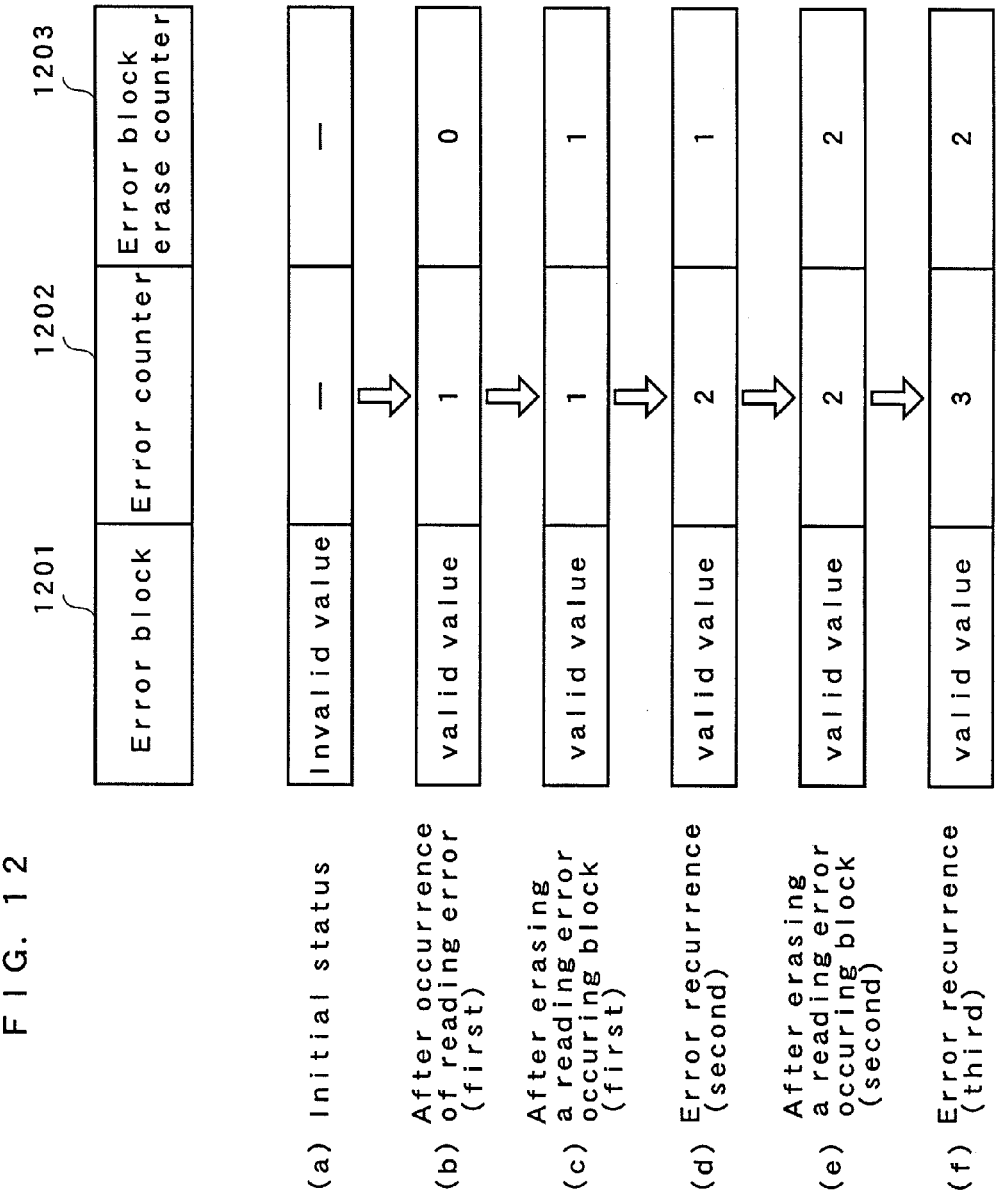
FIG. 12 is a view showing an ECC error record and change of information stored in the ECC error record in a third embodiment.

FIG. 12 shows a configuration of the ECC error records #i in the present embodiment. FIG. 12 shows fields in the ECC error record #i and changes of information stored in the ECC error record #i. An error block 1201 stores a physical address of a physical block causing an error. An error counter 1202 stores the number of occurrences of reading errors. When a reading error further occurs in data newly written after physical erasing of the physical block, the number of error occurrences in the error counter 1202 is increased by 1 step. The error block erase counter 1203 indicates the number of physical erasing of a physical block causing an error.

Data reading in the nonvolatile storage device in the present embodiment is executed according to the flowchart shown in FIG. 7, and processing in each step except S707 is the same as that in the first embodiment. Registration of the ECC error table in S707 executed when error correction is impossible in S703 will be explained here.

Figure 13:
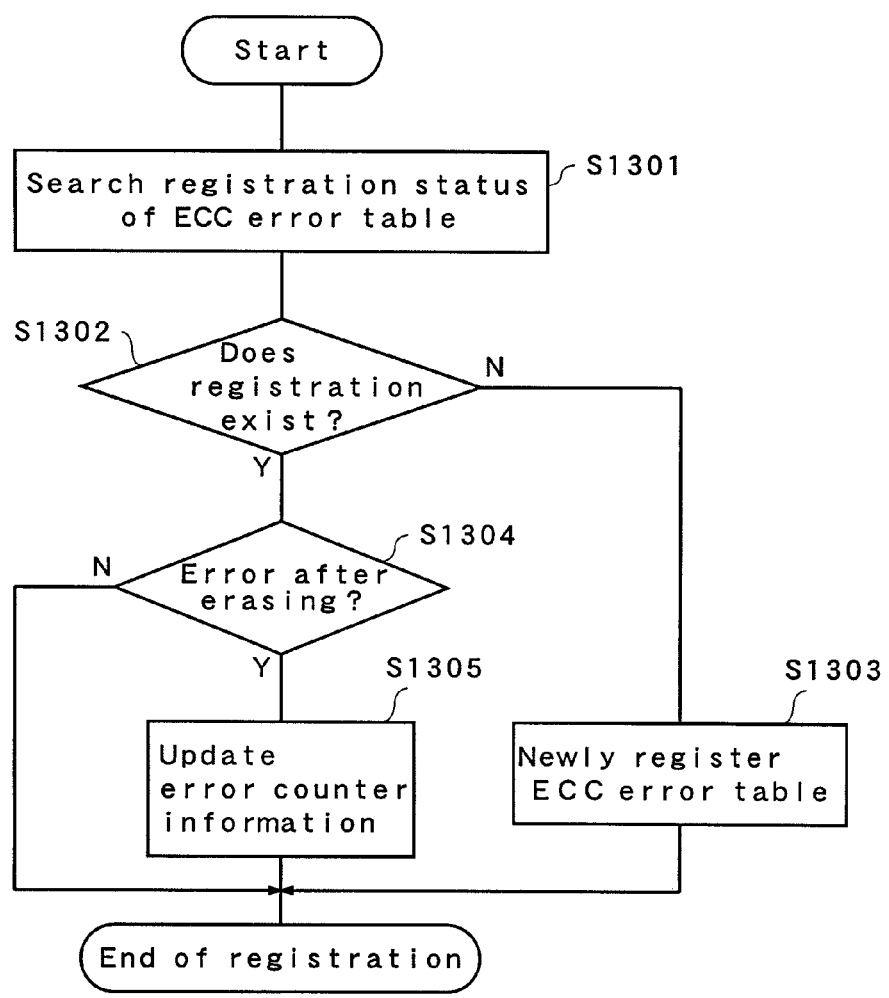
FIG. 13 is a flowchart of registration of the ECC error table in the third embodiment.

FIG. 13 shows registration processing of the ECC error table. At first, the MPU 105 searches a registration status of the ECC error table 111 (S1301). Concretely, the search is for searching an ECC error record #i retaining an address of a physical block causing an error in the error block 601.

When there is no ECC error record #i in the searching at S1301, the MPU 105 judges that no registration exists (S1302), and newly registers the ECC error record #i (S1303). FIG. 12 (b) shows a status after the new registration. An address of the physical block causing a reading error is written into the error block 1201 as a valid value. The value "1" indicating that a reading error occurred once is written into the error counter 1202. The value "0" indicating that the number of physical erasing after error occurrence is 0 is written into the error block erase counter 1203.

When the MPU 105 judges at S1302 that the registration exists, the MPU 105 refers to the registered ECC error record #i and judges whether it is the first error which occurred after physical erasing or not (S1304). Concretely, the error counter 1202 and the error block erase counter 1203 of the ECC error record #i detected at S1301 are compared to each other. When the error counter has a larger value than that of the error block erase counter 1203, the MPU 105 judges that last update of the ECC error record #i is increment of the error counter 1202 due to occurrence of reading error. The registration of the ECC error table 111 is completed without updating the ECC error record #i since physical erasing is not executed after a reading error. After registering or updating the error counter 1202 once, even if the reading error occurs many times, it cannot be judged whether the error is caused by accident or the fixed defect as far as the physical block 201 is not physically erased. Thus, the error counter 1202 is not further incremented when a value of the error counter 1202 is larger than that of the error counter 1203.

When the values of the error counter 1202 and error block erase counter 1203 are same, it is determined that last update of the ECC error record #i is increment of the error block erase counter 1203 due to physical erasing. The MPU 105 judges that reading error has occurred after physical erasing and transfers a step of the processing to S1305 since the physical erasing was executed after error occurrence. As the changes from (c) to (d) and from (e) to (f) in FIG. 12, the MPU finishes updating of the table after rewriting information of the error counter 1202 with increasing by 1. The reading error which requires updating contents of the ECC error record #i is a reading error further occurring in newly written data after physically erasing a physical block which caused an error once.

Figure 14:
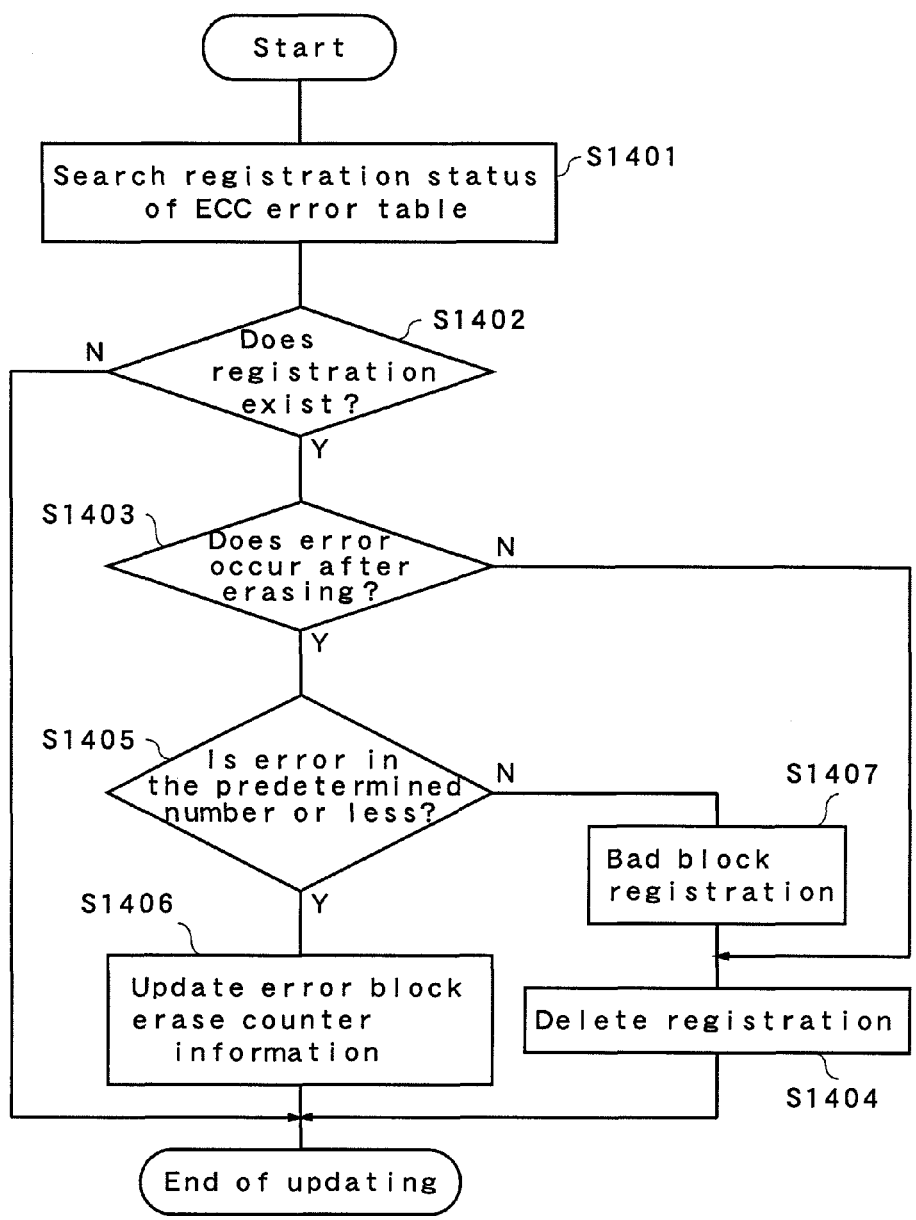
FIG. 14 is a flowchart of updating of the ECC error table in physical erasing in the third embodiment.

FIG. 14 is a flowchart of updating of the ECC error table in physical erasing before data writing. The MPU 105 searches registration status of the ECC error table 111 at first (S1401). Concretely, the search is for searching an ECC error record having an address of a physical block, an object for physical erasing, of the flash memory 103 in the error block 1201.

When there is no ECC error table #i corresponding to the physical address in the searching at S1401, the MPU 105 judges that no registration exists (S1402) and finishes the processing without updating the ECC error table 111. When there is a corresponding ECC error table #i in the searching at S1401, the MPU 105 judges that the registration exists (S1402).

The MPU 105 judges whether or not error occurred after physical erasing with referring to the ECC error record #i (S1403). Concretely, when the error counter 1202 and the error block erase counter 1203 are compared with each other and both of them indicate same value, the MPU 105 judges that the last update of the ECC error record #i is increment of the error block erase counter 1203 and that error did not occur after the erasing. For this reason, The MPU 105 judges that the error occurred before physical erasing is an accidental error. After this judgment, the MPU 105 deletes the registration of the ECC record #i (S1404), and completes the updating of the ECC error table 111. As shown in FIG. 12(a), the registration can be deleted by setting a value of the error block 1201 in an invalid value.

When the error counter 1202 is a larger value than that of the error block erase counter 1203 after comparing the error counter 1202 in the ECC error record #i to the error block erase counter 1203, the MPU 105 judges at S1403 that the last update of the ECC error record #i is increment of the error counter 1202 due to occurrence of error and that an error occurred after the erasing. The MPU 105 refers to the error counter 1202 (S1405), and judges whether the error counter is within a predetermined number. When within the predetermined number, a value of the error block erase counter 1203 in the ECC error table 111 is increased only by 1 since a bad block registration is not required (S1406), and the update of the ECC error table 111 finishes. When an error occurs with exceeding the predetermined number at S1405, the bad block is registered since the physical block is supposed to have a fixed defect. The bad block registration is to register an address of the physical block to a corresponding BB record i (S1407). After the bad block registration, the registration of the ECC error record #i for the physical block is deleted (S1407).

A method for the bad block registration and a method for preventing a bad block from being used based on registrations to the entry table are the same as those of the first embodiment.

In a case of a storage device using the flash memory with high occurrence frequency of accidental bit errors such as a multi-level flash memory, the accidental error may continuously occur in same physical block or page striding over the physical erasing. In this case, it is not appropriate to register this physical block having no fixed defect as a bad block and restrict use of the physical block. The present embodiment realizes that the number of error occurrences before registration of a bad block can arbitrarily be set to 3 or more. A fixed defect can adequately be detected by setting the predetermined value of the error occurrence number before the bad block registration to be large.

In addition, error page information for recording a physical block page may be added to the ECC error record #i of the present embodiment, and the error table may be registered in units of physical pages. The registration and the update of the ECC error table may be executed regardless of whether a reading error is correctable or not.

Fourth Embodiment

FIG. 1 shows a configuration of a nonvolatile memory device in the present embodiment. The memory card 101 includes the memory controller 102 and the flash memory 103 that is a nonvolatile memory. Respective components included in the memory controller 102 are the same as those described in the first embodiment.

FIG. 2 is a block diagram showing an internal configuration of the flash memory 103, and inside of the flash memory 103 is composed of 1024 physical blocks of PB0 to PB1023. FIG. 3 is a block diagram showing an internal configuration of the physical block, and respective physical blocks include 64 physical pages of PP0 to PP63. These are the same as those described in the first embodiment.

The ECC error table 111 shown in FIG. 5 includes a plurality of the ECC error records #i, and is the same as that described in the first embodiment.

Figure 15:
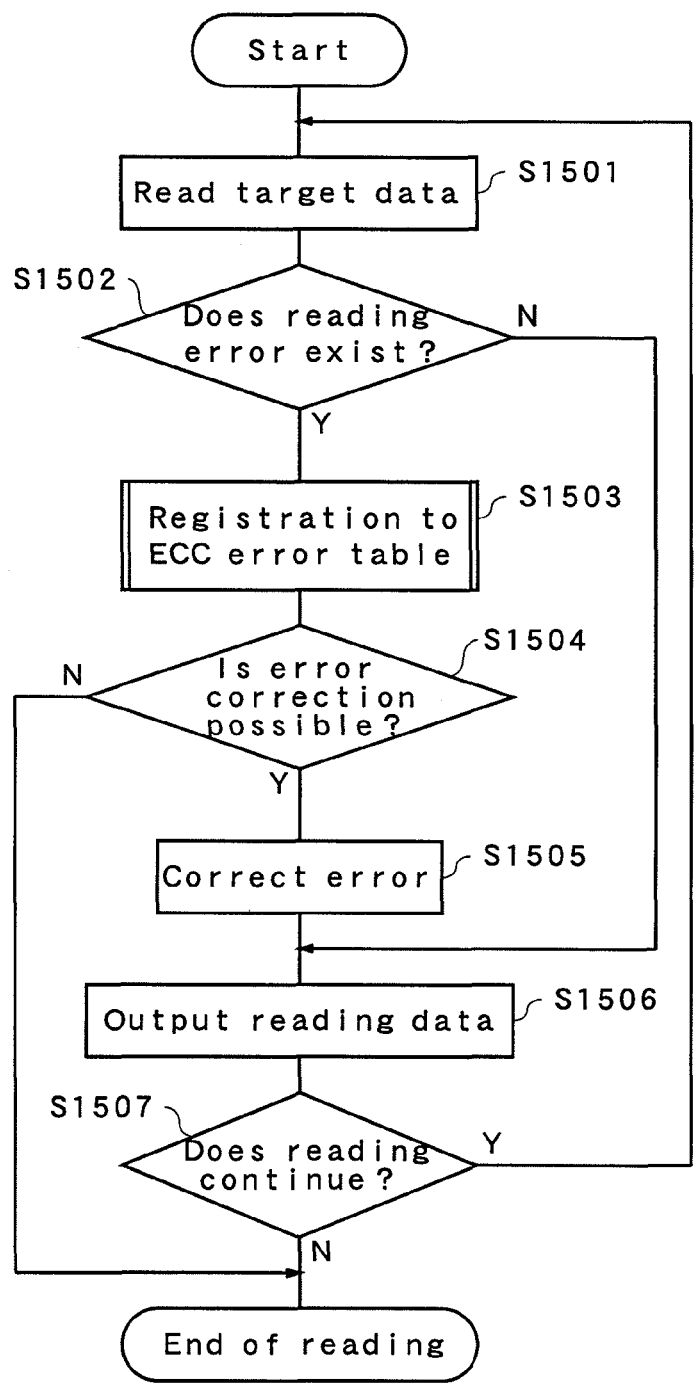
FIG. 15 is a flowchart of reading in a fourth embodiment.

FIG. 15 is a flowchart of data reading in the nonvolatile storage device of the present embodiment. Processing at S1501 is the same as the processing at S701 in the first embodiment.

Subsequently to S1501, the ECC circuit 109 judges whether or not a reading error occurred in the read data (S1502). When a reading error did not occur, the MPU 105 directs the host interface 104 to output data to an external host apparatus (S1506). After that, as far as the reading continues (S1507), the data reading processing continues by looping, that is, returning to S1501 with increasing an address in units of reading.

When the ECC circuit 109 judges whether a reading error occurred or not (S1502) and the reading error occurred, registration of the ECC error record #i is executed to the ECC error table 111 (S1503). When the registration to the ECC error table 111 is completed, the ECC circuit 109 judges whether the reading error is correctable or not (S1504) and corrects the reading error when the error is correctable (S1505). The read data is outputted after the error correction, and it is judged whether the data reading continues or not (S1507). When the correction of the reading error is impossible (S1504), the reading is immediately finished.

In the present embodiment, when a reading error is detected, the registration of the ECC error table 111 is executed regardless of possibility of error correction. The registration process for the ECC error table 111 is the same as that of the first embodiment as shown in FIG. 8.

The updating of the ECC error table and the registration of a bad block in physical erasing which is executed before data writing are the same as those of the first embodiment as shown in FIG. 9.

The method for registering a bad block and the method for preventing, based on the registration to the entry table, a bad block from being used are the same as those of the first embodiment.

In a case where the memory card is composed of the flash memory 103 with low occurrence frequency of an accidental bit error such as a single-level flash memory, the frequency where two uncorrectable errors continuously occur striding over physical erasing is very low, and most errors are correctable. Since there are many cases where an error even caused by a fixed defect is correctable, a physical block having the fixed defect cannot be detected if the registration for the ECC error table is executed only when error correction is impossible. On the other hand, the present embodiment is adequately able to restrict use of a physical block in which a fixed defect exists even in the flash memory with low occurrence frequency of an accidental bit error since registration of the ECC error record #i is executed in the ECC error table regardless of whether error is correctable or not when the bit error is detected.

In addition, after adding error page information for recording a physical block page to the ECC error record #i of the present embodiment, the error table may be registered in units of physical pages. Furthermore, the registration and the updating of the ECC error table may be executed regardless of whether a reading error is correctable or not.

Fifth Embodiment

Figure 16:
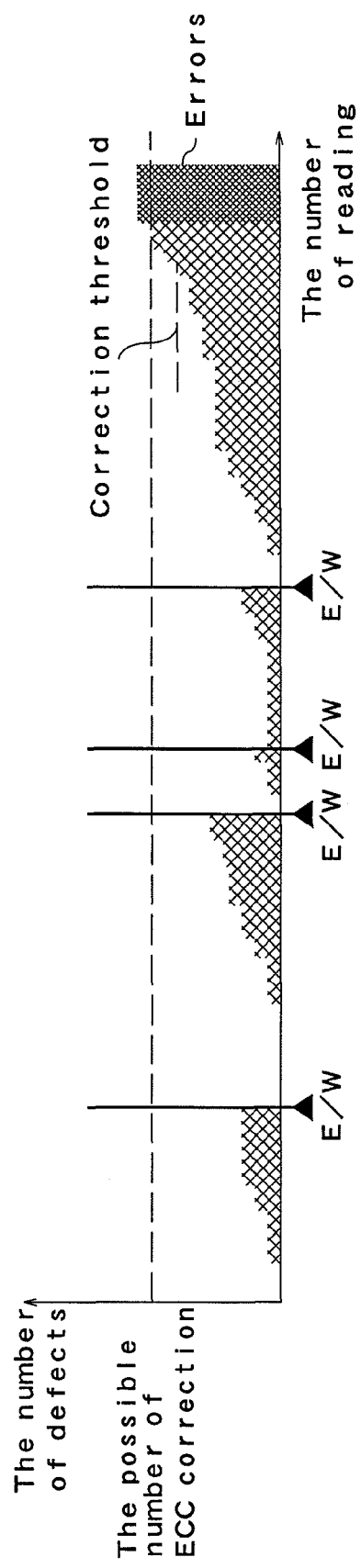
FIG. 16 is a view showing an occurrence status of progressing errors.

FIG. 16 shows an aspect where bit errors increase according to the number of readings when data written in a physical block is read repeatedly. In the drawing, a mesh design indicates the number of occurring error bits and as the number of reading increases, the number of meshes increases toward a broken line of the number of bits correctable by the ECC.

These errors occur because a bit written in a memory cell changes due to voltage applied to the memory cell for the purpose of data reading. In the present embodiment, these errors are referred to as progressive errors.

Parts indicated by the E/W in FIG. 16 show data erasing and writing and show that new data is written in the same physical block after erasing data in the physical block. Although the progressive error once disappears immediately after the E/W, a correction ability of the ECC circuit loses a spare ability since the number of bits of the progressive error gradually increases when the number of data reading increases. It is not preferable that an error of the bits number exceeds the correction ability of the ECC circuit by the repeated data reading under these situation. A correction threshold value equal to or less than the number of correctable bits of the ECC circuit is provided, and when errors of the bits number of equal to or more than the correction threshold value are detected in data read from certain physical block, the detected errors are corrected and the corrected data is written into another physical block. As a result of this, the progressive error disappears once, safety of data is secured, and the ECC circuit recovers the spare ability in correction ability. In the present embodiment, the number of correctable bits of the ECC circuit and the correction threshold are set to be 4 bits. In the present embodiment, a method for dealing with the above mentioned problem will be explained.

Figure 17:
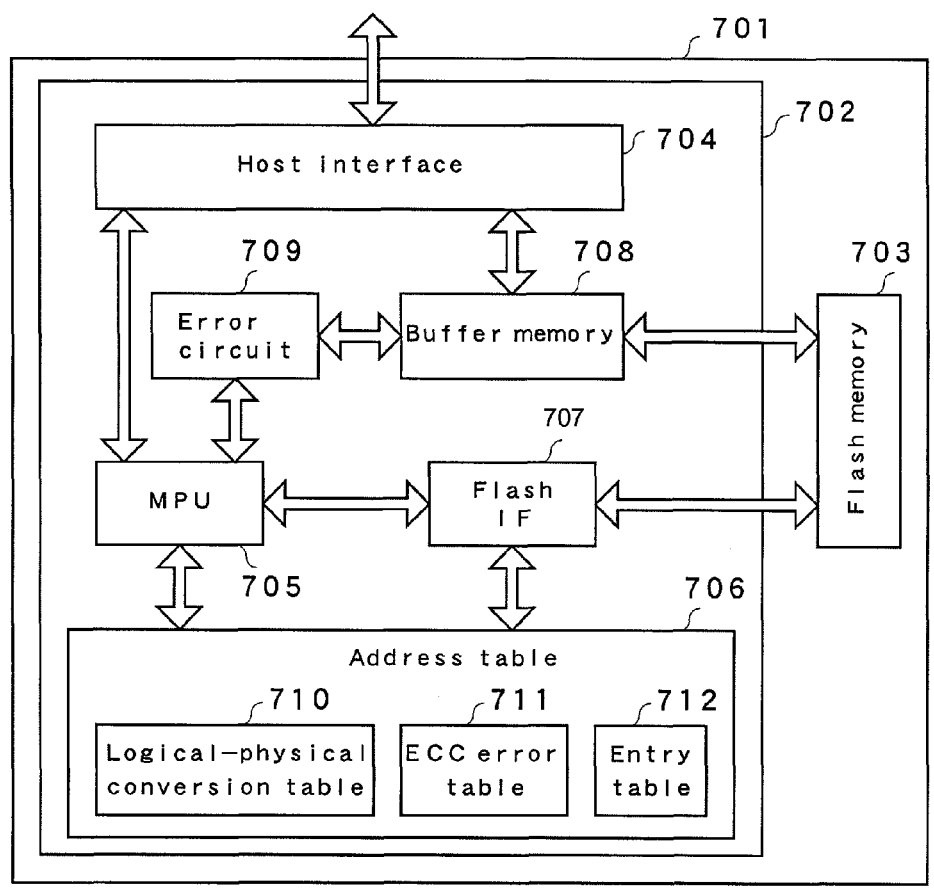
FIG. 17 is a block diagram showing a configuration of a nonvolatile storage device in a fifth embodiment.

The present embodiment will be explained below. FIG. 17 is a block diagram showing a configuration of the nonvolatile storage device of the present embodiment. A memory card 701 includes a memory controller 702 and a flash memory 703 which is a nonvolatile memory.

Figure 18:
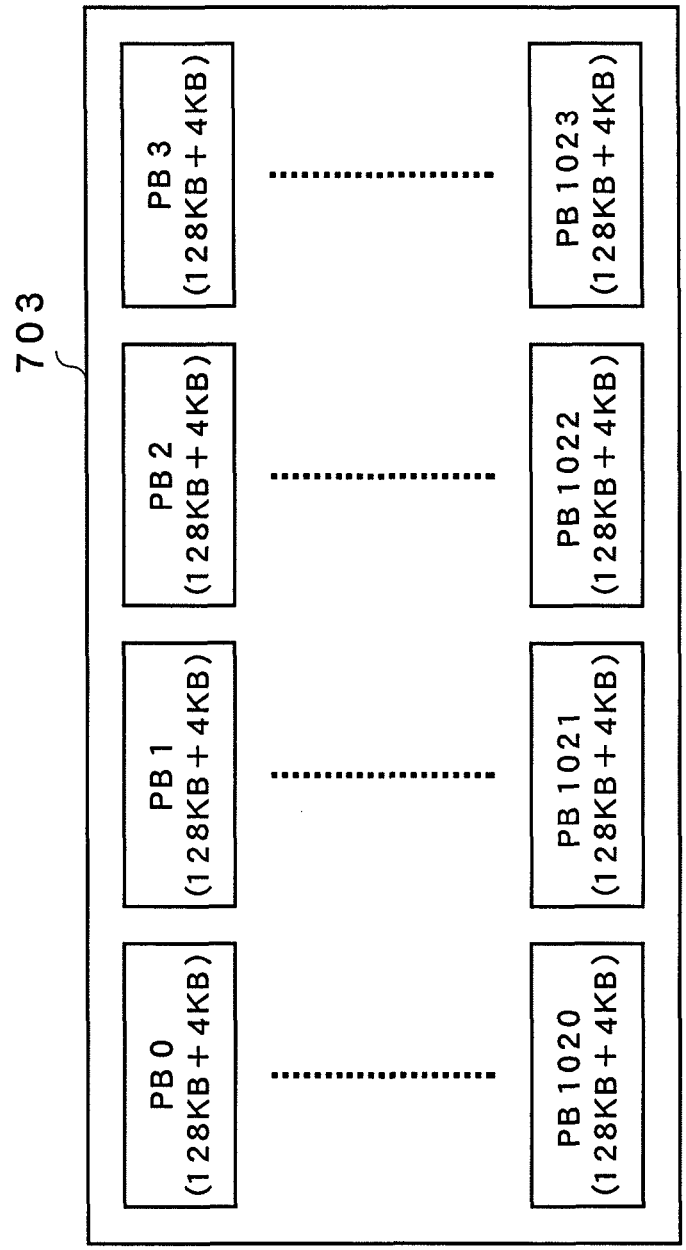
FIG. 18 is a block diagram showing an internal configuration of a flash memory.

FIG. 18 is a block diagram showing an internal configuration of the flash memory 703. The flash memory having a capacity of 1 Gbits will be explained here. Inside of the flash memory 703 is composed of 1024 physical blocks of PB0 to PB1023. The physical block is a minimum unit for data erasing in the flash memory 703. A capacity of a physical block is represented as 128 kB+4 kB. This shows that a data capacity of a physical block is 128 kB and that management data such as the ECC code and logical address of the corresponding physical block is written in the area of 4 kB.

Figure 19:
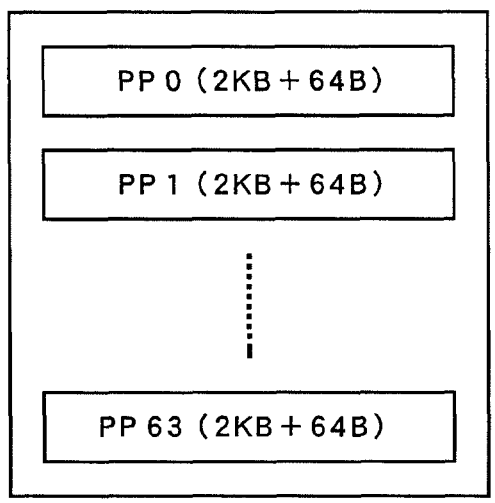
FIG. 19 is a block diagram showing an internal configuration of a physical block 201.

FIG. 19 is a block diagram showing a configuration of inside of the physical block. Respective physical blocks in the flash memory 703 include 64 physical pages of PP0 to PP63. The physical page is a minimum unit of data writing in the flash memory 703. A capacity of a physical page is 2 kB+64 B. This shows that a capacity for data to be written in a physical page is 2 kB and that management data including ECC is written in the remaining area of 64 B.

The memory controller 702 includes a host interface 704, an address table 706, a flash interface 707, a buffer memory 708, an ECC circuit 709, and an MPU (a small processing unit) 705. The host interface 704 controls an interface with a host device externally connected to the memory card 701.

The address table 706 is a table retaining management information for data stored in the flash memory 703 and includes a logical-physical conversion table 710, an ECC error table 711, and an entry table 712. These tables are retained in a volatile memory.

The logical-physical conversion table 710 is a table showing a correspondence relation between addresses of logical blocks which are logical addresses specified from outside of the memory card 701 and addresses of physical blocks which are physical addresses inside the flash memory 703. The logical-physical conversion table 710 is for obtaining a physical address corresponding to the logical block from the logical address.

The ECC error table 711 retains information such as physical addresses of physical blocks causing a reading error, a history of physical erasing of data, and a history of reading errors which occurred after physical erasing, and is used for detecting a physical block having a fixed defect.

The entry table 712 is a table for retaining information indicated by 1 bit for each physical block in the flash memory 703, which shows whether data is already written or erased. For example, the physical block to which data is already written is indicated by a bit "0" and the already erased physical block is indicated by a bit "1".

The flash interface 707 writes data in the buffer memory 708 into the flash memory 703 under control of the MPU 705 described below, writes data in the flash memory 703 into the buffer memory 708, and erases data in the flash memory 703. The buffer memory 708 is a volatile memory for temporarily retaining data when data is written and read between the external host device and the flash memory 703.

The ECC circuit 709 generates ECC codes attached to writing data transferred from the buffer memory 708 to the flash memory 703. In addition, the ECC circuit 709 is an error correction circuit which executes the ECC calculation to data read from the flash memory 703 into the buffer memory 708 to detect an error, and corrects the data in the buffer memory 708 when the error is a correctable error.

The MPU 705 is a microcomputer for controlling the whole of the memory controller 702. When writing and reading data with the host apparatus, the MPU controls the host interface 704, the ECC circuit 709, the flash interface 707, and the address table 706 directly. When an error exists in reading data, the MPU 705 refers to information of the ECC error table 711 in the address table 706 and updates the ECC error table 711 as needed. Further, the MPU 705 also updates the entry table in accordance with contents of the updated BB table.

Figure 20:
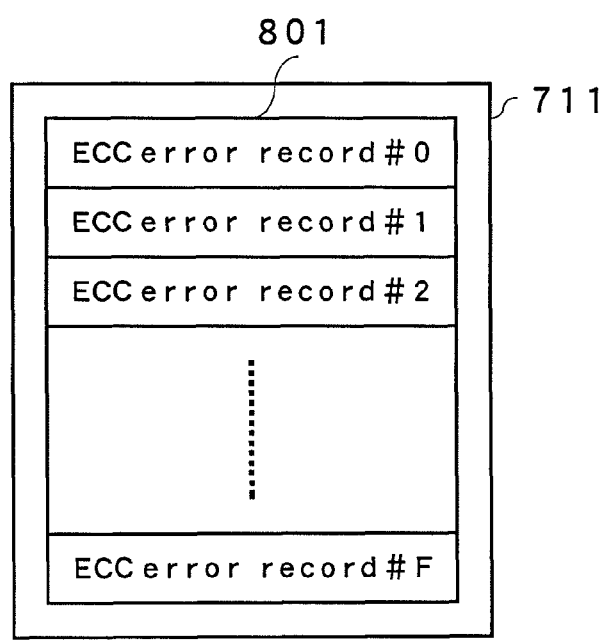
FIG. 20 is a view showing a configuration of the ECC error table 111.

FIG. 20 is a view showing a configuration of the ECC error table 711. The ECC error table 711 is composed of 16 ECC error records #i of #0 to #F indicated by the hexadecimal number.

Figure 21:
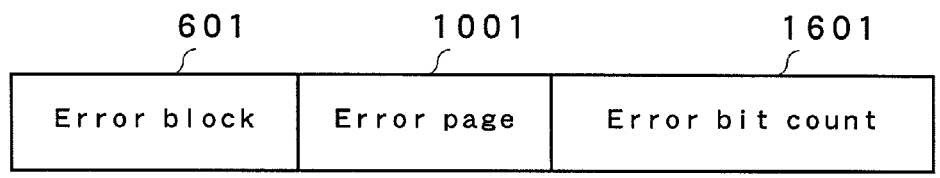
FIG. 21 is a view showing an ECC error record in the fifth embodiment.

FIG. 21 shows a configuration of the ECC error record #i in the present embodiment. The ECC error record #i in the present embodiment includes the error block 601 for storing addresses of physical blocks causing an error, the error page 1001 for storing addresses of physical pages causing the error, and an error bit count 1601 for storing the number of bits of an occurring error as well. This error bit count 1601 retains information of the bit number of an occurring reading error and the number shows degrees of a bit error occurred in the ECC error record #i.

Figure 22:
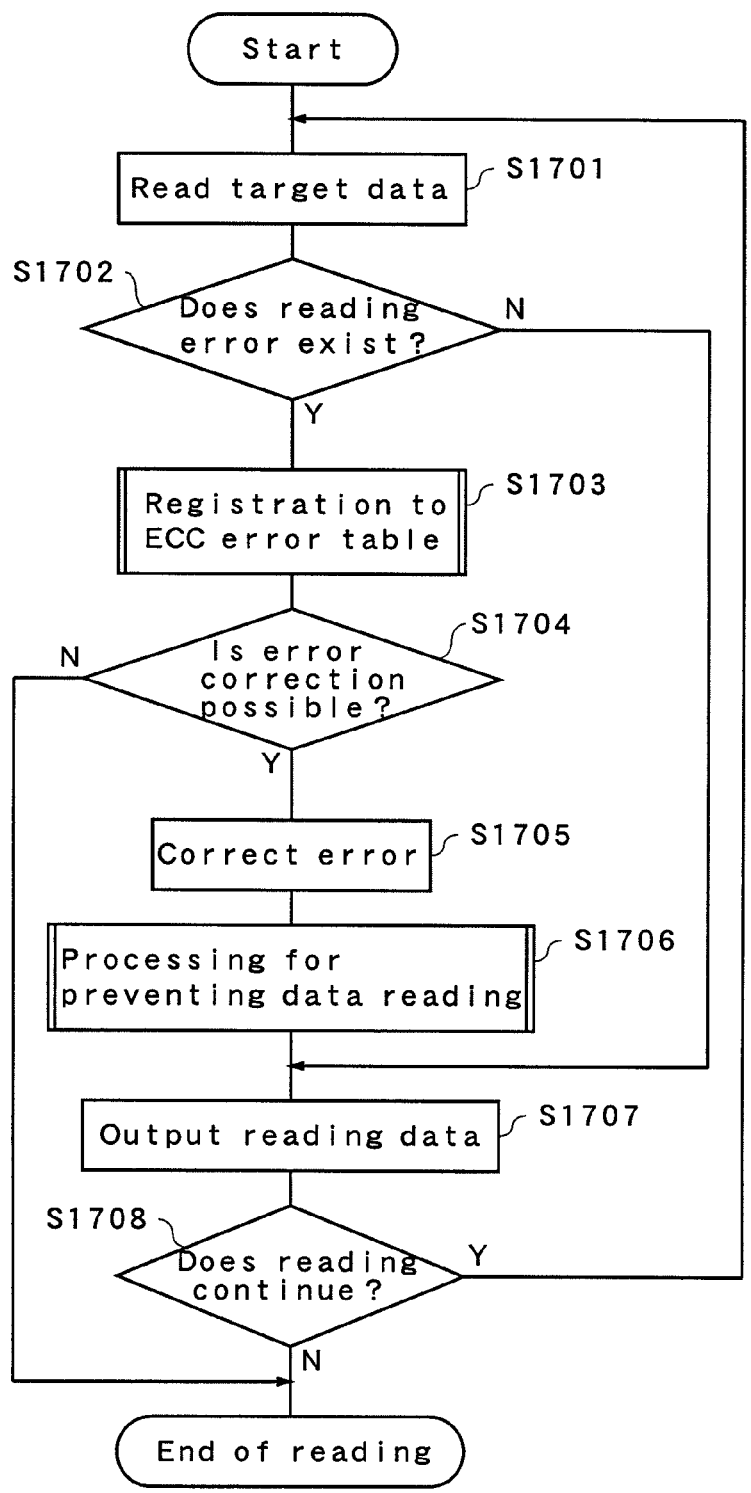
FIG. 22 is a flowchart of reading in the fifth embodiment.

FIG. 22 is a flowchart of data reading in the nonvolatile storage device in the present embodiment. The MPU 705 indicates addresses of a physical block and a physical page to be read to the flash memory interface 707, and read data from the flash memory 703 (S1701). Following S1701, the ECC circuit 709 judges for the read data whether reading error has occurred or not. (S1702). In a case where the reading error has not occurred, the MPU 705 directs the host interface 704 to output the data to the external host device (S1707). After that, as far as the reading continues (S1708), processing of the data reading continues by looping, that is, returning to S1701 with increasing the address in reading units.

In a case where the reading error occurred in the judgment in S1702, the registration to the ECC error table 711 is executed (S1703). When the registration to the ECC error table 711 is completed, the ECC circuit 709 judges whether the reading error is correctable 4 bits or less (S1704). When the correction of the reading error is impossible (S1704), the data reading is immediately aborted.

When the correction is possible, the reading error is corrected (S1705). After the correction of the reading error, a data correcting-copying process is executed (S1706), and the read data is outputted (S1707). After that, it is judged whether or not the reading continues (S1708).

Figure 23:
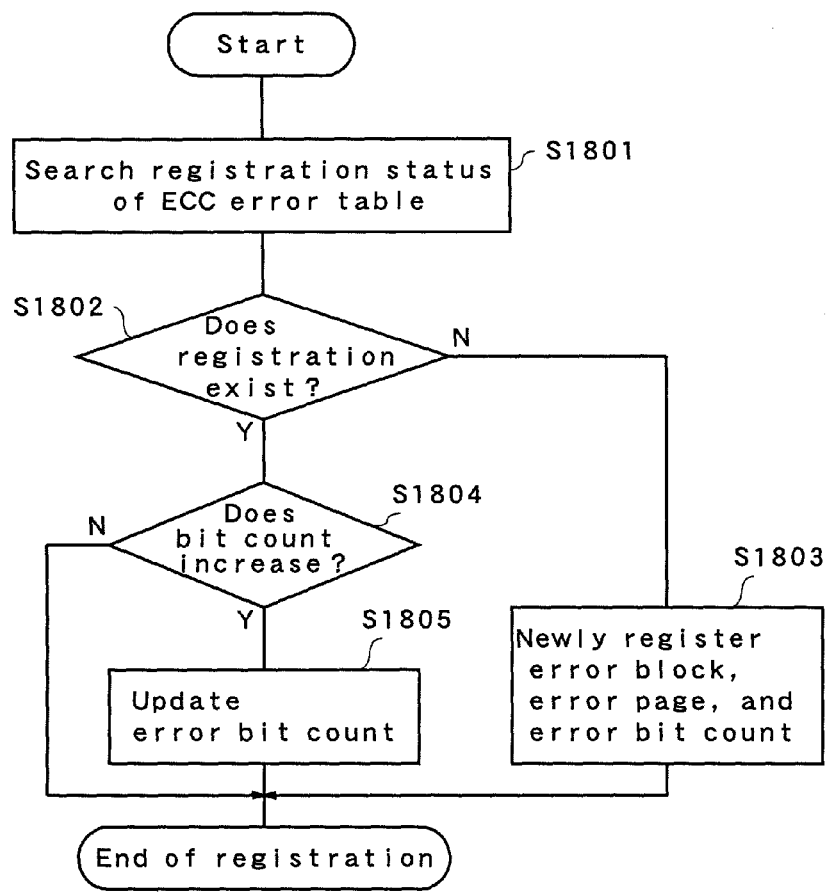
FIG. 23 is a flowchart of registration of the ECC error table in the fifth embodiment.

In the present embodiment, when the reading error is detected, the registration to the ECC error table is executed regardless of whether the correction is possible or not. Using a flowchart of FIG. 23, a process of the registration (S1703) to the ECC error table will be explained here.

When a reading error is detected, the MPU 705 searches a registration status of the ECC error table 711 (S1801). Concretely, the MPU 705 checks whether the physical addresses of the physical block and the physical page causing a reading error correspond to values of the error block 601 and the error page 1001 in any one of the ECC error records #i of the ECC error table 711.

When there is no corresponding ECC error record #i in the searching at S1801, it is judged that no registration exists (S1802). Subsequently, respective values of the error block 601, the error page 1002, and the error bit count 1603 are registered to the empty ECC error record #i (S1803). If 5 or more bits error which exceed the correction ability of the ECC circuit 709 occur at this moment, the error bit count to be registered to the ECC error record #i cannot be determined. In this case, a value for informing impossibility of the correction is registered. For example, when the maximum correction ability of the ECC circuit 709 is 4 bits, a value of 5 which exceeds the maximum correction ability can be registered.

When a registration of the ECC error record #i is detected in S1802, the MPU 705 judges whether or not a bit count of the present error is larger than the error bit count of the ECC error record #i (S1804). After comparing the error bit count 1601 of the registered ECC error record #i to the error bit count in the reading, if the bit count does not increase, the process is completed without updating the ECC error record. If the bit count increases, the registration of the ECC error table is completed after rewriting the error bit count 1601 to be the increased value (S1805).

Figure 24:
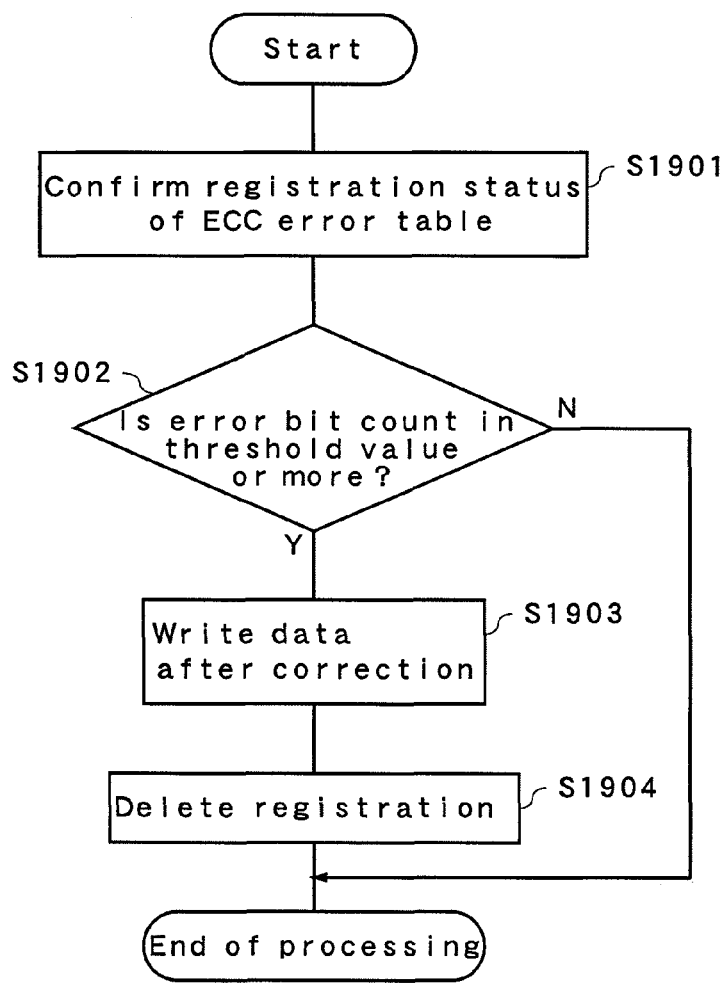
FIG. 24 is a flowchart of a data correcting-copying process in the fifth embodiment.

Using a flowchart of FIG. 24, the data correcting-copying process (S1706) will be explained here. After the correction of the correctable error (S1705), the MPU 705 judges whether or not data in the physical page which is read this time may be repeatedly read in the future. This judgment is for executing adequate processing to judge whether or not there is a high possibility of occurrence of uncorrectable bit error when the data is repeatedly read in the future.

The MPU 105 obtains a value of the error bit count 1601 is obtained from the ECC error table #i at first (S1901). Next, the MPU 105 judges whether the obtained error bit count is the correction threshold value of 4 bit and above (S1902). When the error bit count is less than the correction threshold value of 4 bit, the MPU 105 judges that the error will not immediately grow to be uncorrectable reading error if the error bit increases in the future, and then, completes the data correcting-copying process.

Since the error bit count is equal to the correction threshold when the error bit count is 4 bits, writing of the corrected data (S1903) is executed. Concretely, the MPU 705 writes the corrected data in, for example, the buffer memory 708 into an arbitrary physical block of the flash memory 703. The physical block to which the data is written this time is a physical block other than the physical block from which the data is read. Finally, the MPU 105 deletes the registration of the ECC error record #i belonging to the physical block causing an error (S1904).

As described above, the MPU 105 judges that the data in the physical page which caused the error bit count equal to or more than the correction threshold value is likely to expand to uncorrectable reading error in the future, corrects the data while being correctable, and writes the corrected data into a physical page in another physical block.

In the present embodiment, when the number of occurring bit errors is 5 or 6 bits exceeding the correction ability of the ECC circuit and the error correction is impossible, the data correcting-copying process (S1706) is not executed. When the error correction is possible, the number of bits in the error within a range correctable by the ECC circuit 709 is 4 bits or more than the correction threshold value, data after error correction is written into another physical block of the flash memory 103.

The error bit count 1601 is provided to the ECC error record #i of the ECC error table 711 here, however, the error bit count may be replaced by information showing degrees of errors. It can be easily found that the effectiveness of the present invention can be realized by using a flag as the error occurrence information showing whether the error bit is equal to or more than the correction threshold value or not without using the specific bit number. Furthermore, the registration of the ECC error table may be executed only when an error correctable and the error bit thereof is equal to or more than the correction threshold value occurs.

In the present embodiment, the error bit count 1601 is used on the premise of using the ECC circuit for a bit correction. However, when it is assumed to use an error correction circuit such as the Reed-Solomon code which can execute a symbol correction instead of the bit correction, it is required to apply information of the number of symbols in which an error occurred for an error symbol count instead of the error bit count.

Sixth Embodiment

FIG. 17 shows a configuration of a nonvolatile memory device in the present embodiment. The memory card 701 includes the memory controller 702 and the flash memory 703 which is a nonvolatile memory. Respective components included in the memory controller 702 are the same as those explained in the fifth embodiment.

FIG. 18 is a block diagram showing an internal configuration of the flash memory 103 and inside of the flash memory 703 is composed of 1024 physical blocks of PB0 to PB1203. FIG. 19 is a block diagram showing an internal configuration of the physical block and the respective physical blocks in the flash memory 703 include 64 physical pages of PP0 to PP63. These are the same as those explained in the fifth embodiment. As shown in FIG. 20, the ECC error table 711 includes a plurality of ECC error records #i. In addition, a configuration of the ECC error record #i in the present embodiment is shown in FIG. 21. In addition to the error block 601 for storing addresses of physical blocks causing an error and the error page 1001 for storing addresses of physical pages causing the error, the ECC error record #i includes the error bit count 1601 for storing the number of bits of occurring errors. These are the same as those in the fifth embodiment.

Figure 25:
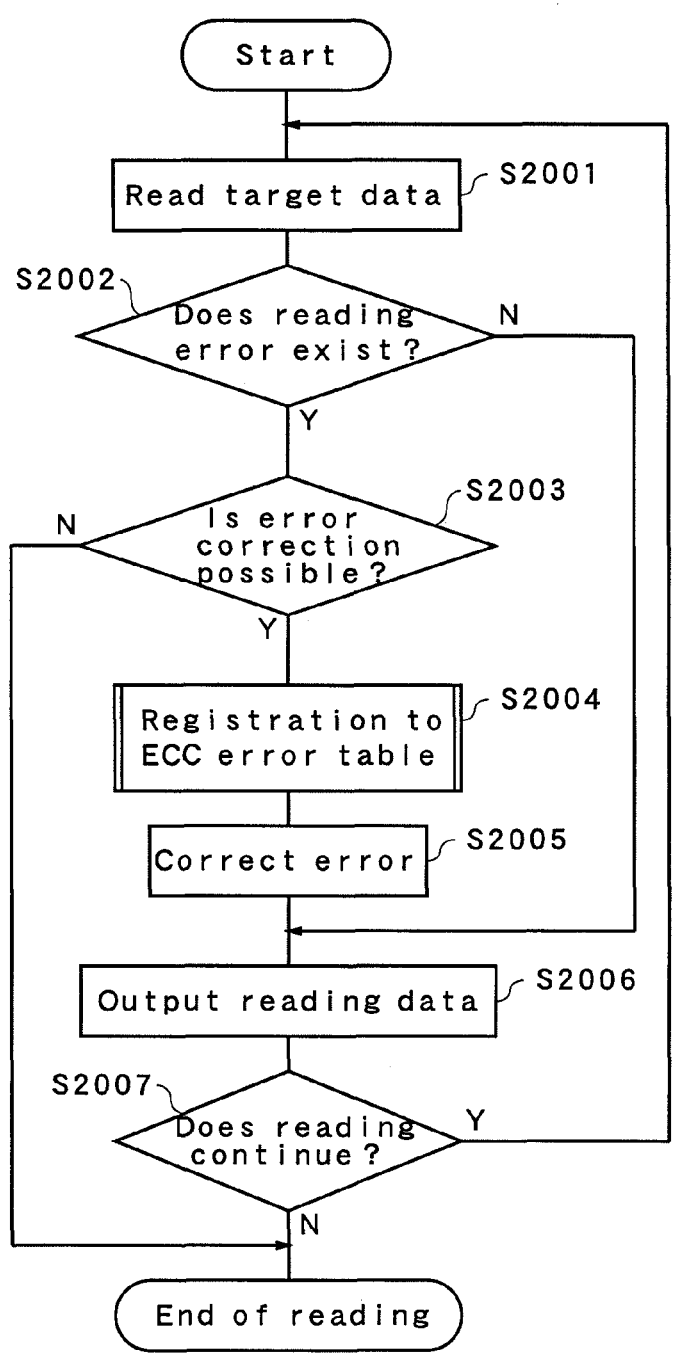
FIG. 25 is a flowchart of reading in a sixth embodiment.

FIG. 25 is a flowchart of data reading in the nonvolatile storage device of the present embodiment. At first, addresses of a physical block and a physical page which are to be read are indicated to the flash memory interface 707, and data is read from the flash memory 703 (S2001). Following S2001, the ECC circuit 709 judges whether reading error occurred or not for the read data (S2002). In a case where a reading error has not occurred, the MPU 705 directs the host interface 704 to output the data to the external host device (S2006). After that, as far as the reading continues (S2007), processing of the data reading continues by looping, that is, returning to S1701 with increasing the address in reading units.

When the ECC circuit 709 judges that a reading error exists (S2002), the ECC circuit 709 judges whether the error is correctable or not (S2003). When the error is judged as uncorrectable error, the process is immediately finished.

When the error is judged as a correctable error, the registration to the ECC error table is executed (S2004). The ECC error table described here is registered in a similar process explained in FIG. 23 of the fifth embodiment. The MPU 705 corrects the error is in the buffer memory 708 after the registration of the ECC error table (S2005), and the MPU 705 directs the host interface 704 to output data to the external host device (S2006). After that, as far as the reading continues (S2007), the MPU 705 continues the reading processing by looping, that is, returning to S2001 with increasing the address in units of reading.

In the present embodiment, the data correcting-copying process executed in the fifth embodiment is not included in the flowchart of data reading. That is aimed at preventing data from being written into the flash memory 703 during a data reading process in the present embodiment. Since writing time of a flash memory is generally longer than reading time, a processing performance will be lowered if such time-consuming writing process is executed in data reading. As a result, data writing to the flash memory 703 is not executed in data reading.

Accordingly, in the present embodiment, the data correcting-copying process is executed in spare time when other processing is not executed. The spare time is a period where processing of data writing and reading from the outside of the memory card 701 is not executed or a period up to execution of data writing or reading after the electric power is supplied for the memory card 701.

Figure 26:
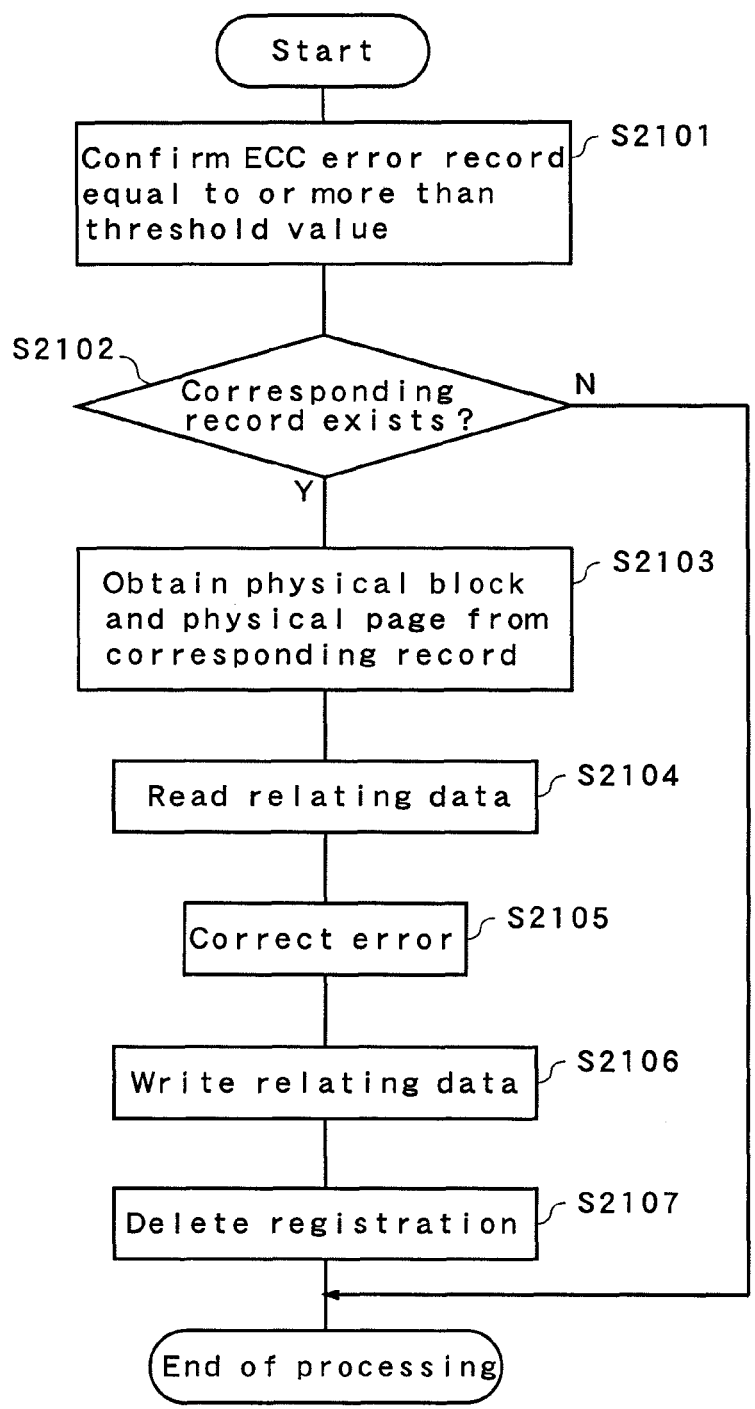
FIG. 26 is a flowchart of a data correcting-copying process in the sixth embodiment.

Using a flowchart of FIG. 26, the data correcting-copying process executed in the spare time will be explained. The MPU 705 searches an error record in the ECC error table 711 in the spare time and selects the ECC error record #i in which the error bit count 1601 is 4 bits more than the correction threshold value (S2101). When a corresponding error record does not exist this time (S2102), the data correcting-copying process finishes.

When the corresponding error record #i exists, addresses of a physical block and a physical page are obtained from the error block 601 and the error page 1001 in the error record #i (S2103). And, data belonging to the obtained address is read out into the buffer memory 708 (S2104). Subsequently, the ECC circuit 109 corrects the error (S2105), and the corrected data is written into an arbitral physical block of the flash memory 703 (S2106). The physical block to which the data is written this time is a physical block other than the physical block registered in the error record #i. The registration of the corresponding error record #i is finally deleted and the process is completed (S2107).

As described above, since it is determined that data of a physical page in which the error bit count equal to or more than the correction threshold value occurred may be expanded to an uncorrectable reading error in the future after correcting an error, the corrected data is written into a physical page of another physical block by using the spare time as mentioned above. If once written data is repeatedly read, defect bits increase. An uncorrectable reading error, however, can be avoided by correcting the data and rewriting it into another physical block.

Also in the present embodiment, when an occurring bit error is uncorrectable, the data correcting-copying process is not executed and the registration to the ECC error table is not executed. Only when the error bits number of the error occurring in reading data of a physical page exceeds the correction threshold value and within a range correctable by the ECC circuit 709, corrected data is written into another physical block of the flash memory 703 and used for reading in order to avoid data reading from the physical page in the future.

Although the error bit count 1601 is provided to the ECC error record #i of the ECC error table 711 here, the error bit count may be replaced by information showing degrees of errors not to be restricted to this. It can be easily found that the effectiveness of the present invention can be realized by using a flag as the error occurrence information showing whether the error bit exceeds the correction threshold value or not without using the specific bit number. Furthermore, the registration of the ECC error table may be executed only when an error correctable and the error bit thereof is equal to or more than the correction threshold value and occurs.

In the present embodiment, the error bit count 1601 is used on the premise of using the ECC circuit for a bit correction. When it is assumed to use an error correction circuit such as the Reed-Solomon code which can execute a symbol correction instead of the bit correction, however, it is required to apply information of the number of symbols in which an error occurred for an error symbol count instead of the error bit count.

INDUSTRIAL APPLICABILITY

Since being able to reduce reading errors by detecting fixed defects in a nonvolatile memory and restricting subsequent use of the block, the nonvolatile storage device according to the present invention can be used for a memory card system using a nonvolatile memory which requires error correction by the ECC such as a storage memory for storing still images of a digital camera.

The invention claimed is:

1. A nonvolatile storage device, comprising:
  a nonvolatile memory including physical blocks, each of the physical blocks including physical pages, and
  a memory controller including:
    a calculation processor that controls the memory controller;
    an error corrector that detects a current error of current data read from one of the physical blocks of the nonvolatile memory; and
    an address table that manages data stored in the nonvolatile memory, the address table including a bad block table for recording information that indicates when the one of the physical blocks is a bad block, wherein
  the calculation processor determines, when the current error is detected by the error corrector in the one of the physical blocks, whether the current error recurred in the one of the physical blocks continuously with a previous error of previous data read from the one of the physical blocks after erasing the previous data stored in the one of the physical blocks, and updates the bad block table when the current error recurred continuously with the previous error after erasing the previous data.

2. The nonvolatile storage device according to claim 1, wherein the error corrector is configured to correct the current error when the current error is correctable, and the calculation processor determines whether the current error recurred in the one of the physical blocks continuously with the previous error after erasing the previous data stored in the one of the physical blocks only when error correction of the current error by the error corrector is impossible.

3. The nonvolatile storage device according to claim 1, wherein the error corrector is configured to detect a plurality of errors in each of the physical blocks, and the address table in the memory controller includes:
   an error table having a plurality of error records that indicate the plurality of errors detected in each of the physical blocks by the error corrector, wherein
   each of the error records of the error table include:
      error block information that indicates an address of a corresponding one of the physical blocks in which one of the plurality of errors is detected by the error corrector;
      error occurrence information that indicates the one of the plurality of errors is detected in the corresponding one of the physical blocks;
      error block erase information that indicates first data in the corresponding one of the physical blocks is erased and second data is written after the one of the plurality of errors is detected in the corresponding one of the physical blocks; and
      error recurrence information that indicates a second of the plurality of errors is detected in the corresponding one of the physical blocks continuously with the one of the plurality of errors detected in the corresponding one of the physical blocks after the first data in the corresponding one of the physical blocks is erased and the second data is written, wherein
   the calculation processor refers to the error record, and determines whether the current error recurred in the one of the physical blocks continuously with the previous error of the previous data read from the one of the physical blocks after erasing the previous data stored in the one of the physical blocks based on the error block information and the error recurrence information of the one of the physical blocks.

4. The nonvolatile storage device according to claim 3, wherein the error occurrence information indicates a number of times the one of the plurality of errors is detected in the corresponding one of the physical blocks,
   the error block erase information indicates a number of physical erases of the first data in the corresponding one of the physical blocks, and
   the calculation processor refers to the error record for the one of the physical blocks, compares the number of times the one of the plurality of errors is detected and the number of physical erases, and further determines that the current error recurred in the one of the physical blocks when the number of physical erases is at least a predetermined number and the number of times the one of the plurality of errors is detected is greater than the number of physical erases.

5. The nonvolatile storage device according to claim 3, wherein each of the error records of the error table further include:
   error page information that indicates an address of one of the physical pages in which the plurality of errors is detected by the error corrector.

6. The nonvolatile storage device according to claim 3, wherein the calculation processor updates the error records of the error table regardless of whether the plurality of errors are correctable by the error corrector when the error corrector detects the plurality of errors.

7. The nonvolatile storage device according to claim 1, wherein the calculation processor determines, when the error is detected by the error corrector, that the error recurred in the physical block continuously with the previous error of previous data read from the one of the physical blocks after erasing the previous data stored in the one of the physical blocks and writing the current data in the one of the physical blocks.

8. The nonvolatile storage device according to claim 1, wherein the information recorded in the bad block table indicates whether the one of the physical blocks is a bad block.

9. The nonvolatile storage device according to claim 8, wherein the bad block table includes the information for each of the physical blocks of the nonvolatile memory.

10. A memory controller for controlling reading and writing of data in a nonvolatile memory including physical blocks, each of the physical blocks including physical pages, the memory controller comprising:
    a calculation processor that controls the memory controller;
    an error corrector that detects a current error of current data read from one of the physical blocks of the nonvolatile memory; and
    an address table that manages data stored in the nonvolatile memory, the address table including a bad block table for recording information that indicates when the one of the physical blocks is a bad block, wherein
    the calculation processor determines, when the current error is detected by the error corrector in the one of the physical blocks, whether the current error recurred in the one of the physical blocks continuously with a previous error of previous data read from the one of the physical blocks after erasing the previous data stored in the one of the physical blocks, and updates the bad block table when the current error recurred continuously with the previous error after erasing the previous data.

11. The memory controller according to claim 10, wherein the error corrector is configured to correct the current error when the current error is correctable, and
    the calculation processor determines whether the current error recurred in the one of the physical blocks continuously with the previous error after erasing the previous data stored in the one of the physical blocks only when error correction of the current error by the error corrector is impossible.

12. The memory controller according to claim 10, wherein the error corrector is configured to detect a plurality of errors in each of the physical blocks, and the address table in the memory controller includes:
    an error table having a plurality of error records that indicate the plurality of errors detected in each of the physical blocks by the error corrector, wherein
    each of the error records of the error table include:
       error block information that indicates an address of a corresponding one of the physical blocks in which one of the plurality of errors is detected by the error corrector;
       error occurrence information that indicates the one of the plurality of errors is detected in the corresponding one of the physical blocks;
       error block erase information that indicates first data in the corresponding one of the physical blocks is erased and second data is written after the one of the plurality of errors is detected in the corresponding one of the physical blocks; and error recurrence information that indicates a second of the plurality of errors is detected in the corresponding one of the physical blocks continuously with the one of the plurality of errors detected in the corresponding one of the physical blocks after the first data in the corresponding one of the physical blocks is erased and the second data is written, wherein the calculation processor refers to the error record, and determines whether the current error recurred in the one of the physical blocks continuously with the previous error of the previous data read from the one of the physical blocks after erasing the previous data stored in the one of the physical blocks based on the error block information and the error recurrence information of the one of the physical blocks.

13. The memory controller according to claim 12, wherein the error occurrence information indicates a number of times the one of the plurality of errors is detected in the corresponding one of the physical blocks, the error block erase information indicates a number of physical erases of the first data in the corresponding one of the physical blocks, and the calculation processor refers to the error record for the one of the physical blocks, compares the number of times the one of the plurality of errors is detected and the number of physical erases, and further determines that the current error recurred in the one of the physical blocks when the number of physical erases is at least a predetermined number and the number of times the one of the plurality of errors is detected is greater than the number of physical erases.

14. The memory controller according to claim 12, wherein each of the error records of the error table further include:

error page information that indicates an address of one of the physical pages in which the plurality of errors is detected by the error corrector.

15. The memory controller according to claim 12, wherein the calculation processor updates the error records of the error table regardless of whether the plurality of errors are correctable by the error corrector when the error corrector detects the plurality of errors.

16. The memory controller according to claim 10, wherein the calculation processor determines, when the error is detected by the error corrector, that the error recurred in the physical block continuously with the previous error of previous data read from the one of the physical blocks after erasing the previous data stored in the one of the physical blocks and writing the current data in the one of the physical blocks.

17. The memory controller according to claim 10, wherein the information recorded in the bad block table indicates whether the one of the physical blocks is a bad block.

18. The memory controller according to claim 17, wherein the bad block table includes the information for each of the physical blocks of the nonvolatile memory.

19. A data processing method of a memory controller for controlling reading and writing of data in a nonvolatile memory including physical blocks, each of the physical blocks including physical pages, the data processing method comprising:

detecting a current error of current data read from one of the physical blocks of the nonvolatile memory;

determining, in response to detecting the current error of the current data, whether the current error recurred in the one of the physical blocks continuously with a previous error of previous data read from the one of the physical blocks after erasing the previous data stored in the one of the physical blocks; and updating a bad block table that includes recording information that indicates when the one of the physical blocks is a bad block in response to determining the current error recurred continuously with the previous error after erasing the previous data.

20. The data processing method according to claim 19, further comprising:

determining whether the current error is uncorrectable; and determining, in response to detecting the current error of the current data, whether the current error recurred in the one of the physical blocks continuously with the previous error after erasing the previous data stored in the one of the physical blocks only in response to determining that the current error is uncorrectable.

21. The data processing method according to claim 19, wherein the method further comprises:

detecting the previous error of the previous data read from the one of the physical blocks of the nonvolatile memory;

recording error block information in an error record of an error table that indicates an address of the one of the physical blocks in response to detecting the previous error;

recording error occurrence information in the error record of the error table that indicates the previous error is detected in the one of the physical blocks in response to detecting the previous error;

erasing the previous data in the one of the physical blocks in response to detecting the previous error;

writing the current data in the one of the physical blocks;

recording error block erase information in the error record of the error table that indicates the previous data in the one of the physical blocks is erased and the current data is written after detecting the previous error, erasing the previous data, and writing the current data;

recording error recurrence information in the error record of the error table that indicates the current error is detected in the one of the physical blocks in response to detecting the current error after detecting the previous error, erasing the previous data, and writing the current data; and determining whether the current error recurred continuously with the previous error after erasing the previous data based on the error recurrence information after detecting the previous error, erasing the previous data, writing the current data, and detecting the current error.

22. The data processing method according to claim 19, further comprising:

determining whether the current error recurred continuously with the previous error of previous data read from the one of the physical blocks after erasing the previous data in the one of the physical blocks and writing the current data in the one of the physical blocks.

23. The data processing method according to claim 19, wherein the information recorded in the bad block table indicates whether the one of the physical blocks is a bad block.

24. The data processing method according to claim 23, wherein the bad block table includes the information for each of the physical blocks of the nonvolatile memory.

* * * * *